(12) United States Patent
Burg et al.

(10) Patent No.: US 11,030,778 B2
(45) Date of Patent: Jun. 8, 2021

(54) METHODS AND APPARATUS FOR ENHANCING COLOR VISION AND QUANTIFYING COLOR INTERPRETATION

(71) Applicant: HEALTHY.IO LTD., Tel Aviv-Jaffa (IL)

(72) Inventors: Bernard Burg, Menlo Park, CA (US); Martin Zizi, Enines (BE); Ivo Clarysse, San Francisco, CA (US); Walter De Brouwer, Los Altos, CA (US)

(73) Assignee: HEALTHY.IO LTD., Tel Aviv-Jaffa (IL)

( * ) Notice: Subject to any disclaimer, the term of this patent is extended or adjusted under 35 U.S.C. 154(b) by 0 days.

(21) Appl. No.: 16/219,934

(22) Filed: Dec. 13, 2018

(65) Prior Publication Data

US 2021/0004995 A1   Jan. 7, 2021

Related U.S. Application Data

(63) Continuation of application No. 14/675,719, filed on Mar. 31, 2015, now abandoned.

(Continued)

(51) Int. Cl.
*G06T 11/00* (2006.01)
*G01J 3/46* (2006.01)
(Continued)

(52) U.S. Cl.
CPC ............. *G06T 11/001* (2013.01); *G01J 3/463* (2013.01); *G01J 3/50* (2013.01); *G02B 27/017* (2013.01);
(Continued)

(58) Field of Classification Search
CPC ................................. G01J 3/46–528
See application file for complete search history.

(56) References Cited

U.S. PATENT DOCUMENTS

| 5,408,535 A | 4/1995 | Howard, III et al. |
| 5,724,148 A * | 3/1998 | Howard, III ......... G01N 21/255 356/402 |

(Continued)

FOREIGN PATENT DOCUMENTS

| DE | 102010011838 A1 | 9/2011 |
| EP | 2646809 B1 | 8/2018 |

(Continued)

*Primary Examiner* — Patrick N Edouard
*Assistant Examiner* — Peijie Shen
(74) *Attorney, Agent, or Firm* — Finnegan, Henderson, Farabow, Garrett & Dunner, LLP

(57) ABSTRACT

In one embodiment, a method is disclosed that includes selecting a first color sample within a target area in a first image of a first object displayed by a display device; selecting a second color sample within a target area in a second image of a second object displayed in the display device; comparing the first color sample against the second color sample to determine a measure of color difference or a measure of color equivalence between the first color sample of the first object and the second color sample of the second object; and displaying the results of the comparison to a user in the display device. One or more of these functions may be performed with a processor.

11 Claims, 24 Drawing Sheets
(23 of 24 Drawing Sheet(s) Filed in Color)

Related U.S. Application Data

(60) Provisional application No. 61/973,208, filed on Mar. 31, 2014.

(51) Int. Cl.
    *G01J 3/50*     (2006.01)
    *G02B 27/01*     (2006.01)

(52) U.S. Cl.
    CPC ... *G01J 2003/467* (2013.01); *G02B 2027/014* (2013.01); *G02B 2027/0112* (2013.01)

(56) References Cited

U.S. PATENT DOCUMENTS

| | | | |
|---|---|---|---|
| 6,285,454 B1 | 9/2001 | Douglas et al. | |
| 8,809,066 B2* | 8/2014 | Matsumoto | G01N 21/78 |
| | | | 436/164 |
| 9,903,857 B2 | 2/2018 | Polwart et al. | |
| 2001/0056237 A1* | 12/2001 | Cane | A61B 5/0059 |
| | | | 600/475 |
| 2002/0136436 A1* | 9/2002 | Schrier | G01N 33/726 |
| | | | 382/128 |
| 2004/0196371 A1* | 10/2004 | Kono | H04N 5/2251 |
| | | | 348/162 |
| 2005/0157304 A1 | 7/2005 | Xiao et al. | |
| 2006/0246574 A1* | 11/2006 | Rosenstein | G01N 33/558 |
| | | | 435/287.2 |
| 2006/0246599 A1* | 11/2006 | Rosenstein | G01N 33/558 |
| | | | 436/514 |
| 2006/0292040 A1 | 12/2006 | Wickstead et al. | |
| 2007/0020697 A1* | 1/2007 | Cualing | G01N 33/57492 |
| | | | 435/7.2 |
| 2007/0058859 A1* | 3/2007 | Baker | H04N 1/60 |
| | | | 382/167 |
| 2010/0254588 A1* | 10/2010 | Cualing | G06T 7/0012 |
| | | | 382/133 |
| 2012/0106811 A1* | 5/2012 | Chen | A61B 10/007 |
| | | | 382/128 |
| 2012/0115216 A1* | 5/2012 | Sharpin | C12Q 1/08 |
| | | | 435/288.7 |
| 2012/0178101 A1 | 7/2012 | Bae et al. | |
| 2012/0282154 A1 | 11/2012 | Slowly et al. | |
| 2013/0172699 A1* | 7/2013 | Rebec | A61B 5/1459 |
| | | | 600/316 |
| 2013/0303869 A1* | 11/2013 | Rebec | A61B 5/14735 |
| | | | 600/365 |
| 2013/0330831 A1* | 12/2013 | Morrow | G01N 21/78 |
| | | | 436/169 |
| 2014/0072189 A1* | 3/2014 | Jena | A61B 5/1455 |
| | | | 382/128 |
| 2014/0154789 A1* | 6/2014 | Polwart | G01N 33/5302 |
| | | | 435/287.2 |
| 2014/0212035 A1* | 7/2014 | Chatow | G01J 3/50 |
| | | | 382/167 |
| 2014/0214802 A1* | 7/2014 | Moroney | G06F 16/5838 |
| | | | 707/722 |
| 2014/0242612 A1 | 8/2014 | Wang et al. | |
| 2015/0031135 A1* | 1/2015 | Zimmerle | G01N 21/274 |
| | | | 436/8 |
| 2015/0168307 A1* | 6/2015 | Kuck | G01N 21/8483 |
| | | | 436/130 |
| 2015/0211987 A1* | 7/2015 | Burg | A61B 5/1172 |
| | | | 356/402 |
| 2016/0029957 A1* | 2/2016 | Faybishenko | A61B 5/150854 |
| | | | 600/309 |

FOREIGN PATENT DOCUMENTS

| | | |
|---|---|---|
| EP | 3470825 A1 | 4/2019 |
| KR | 1020100008840 A | 1/2010 |
| KR | 1020110024747 A | 3/2011 |
| WO | WO 2007/079843 A2 | 7/2007 |

* cited by examiner

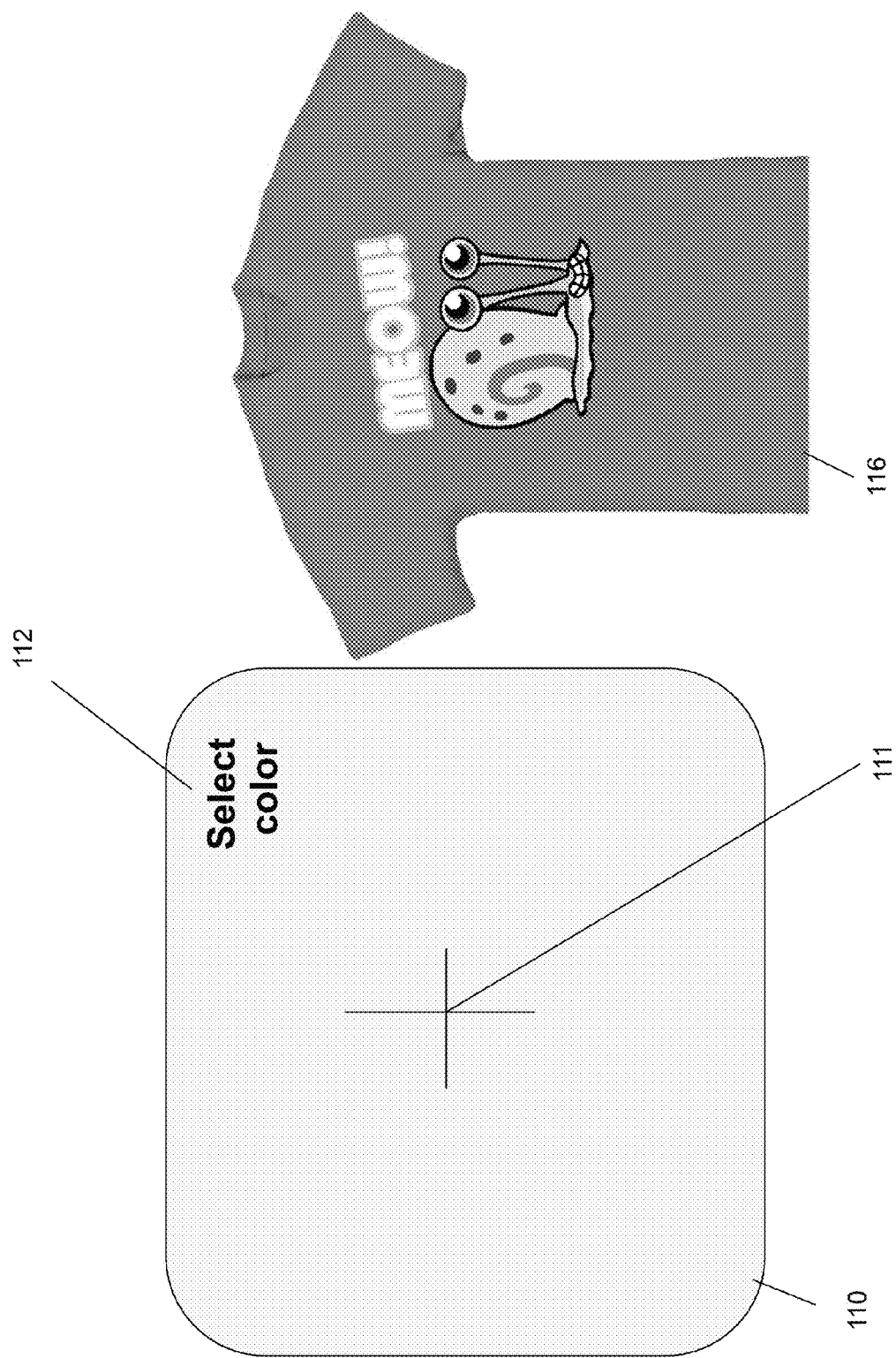

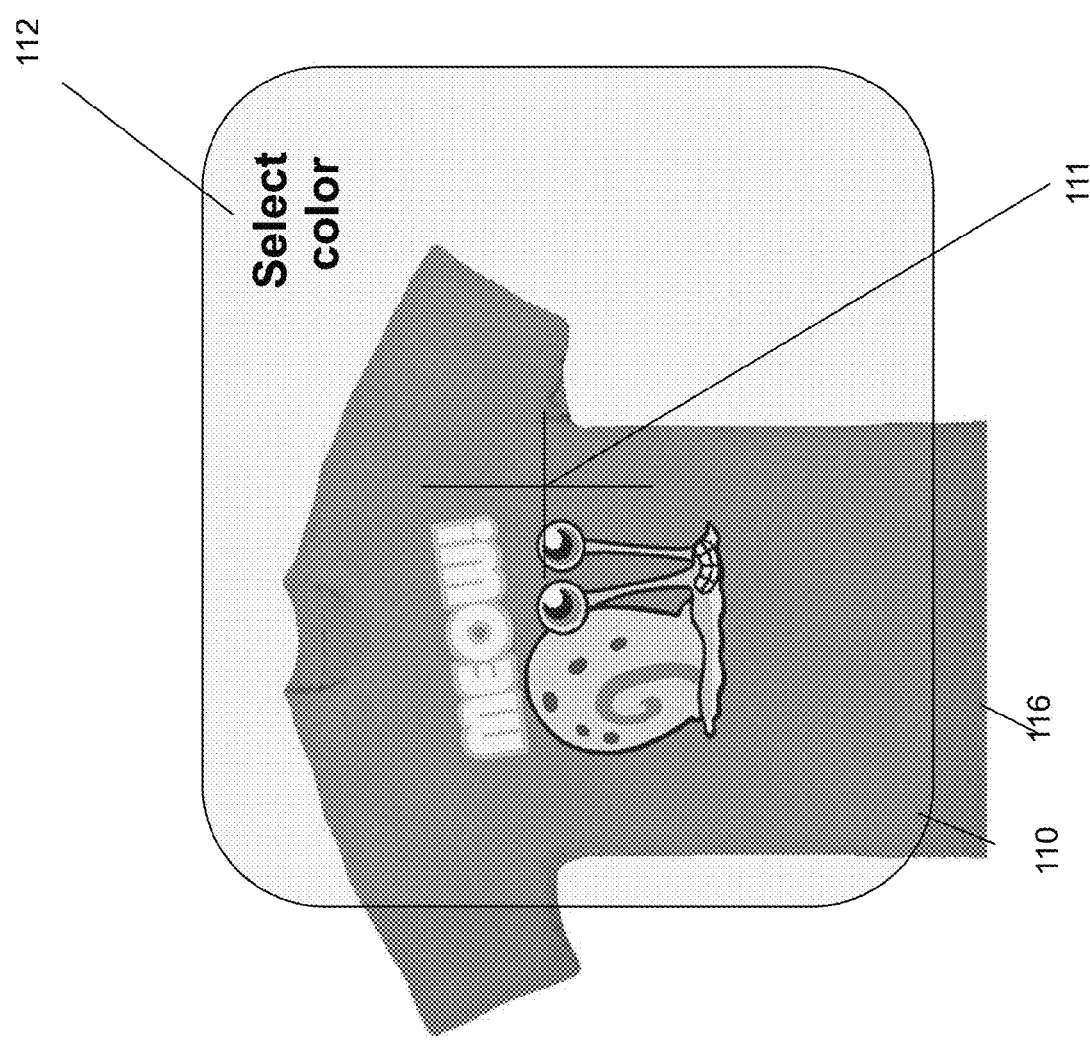

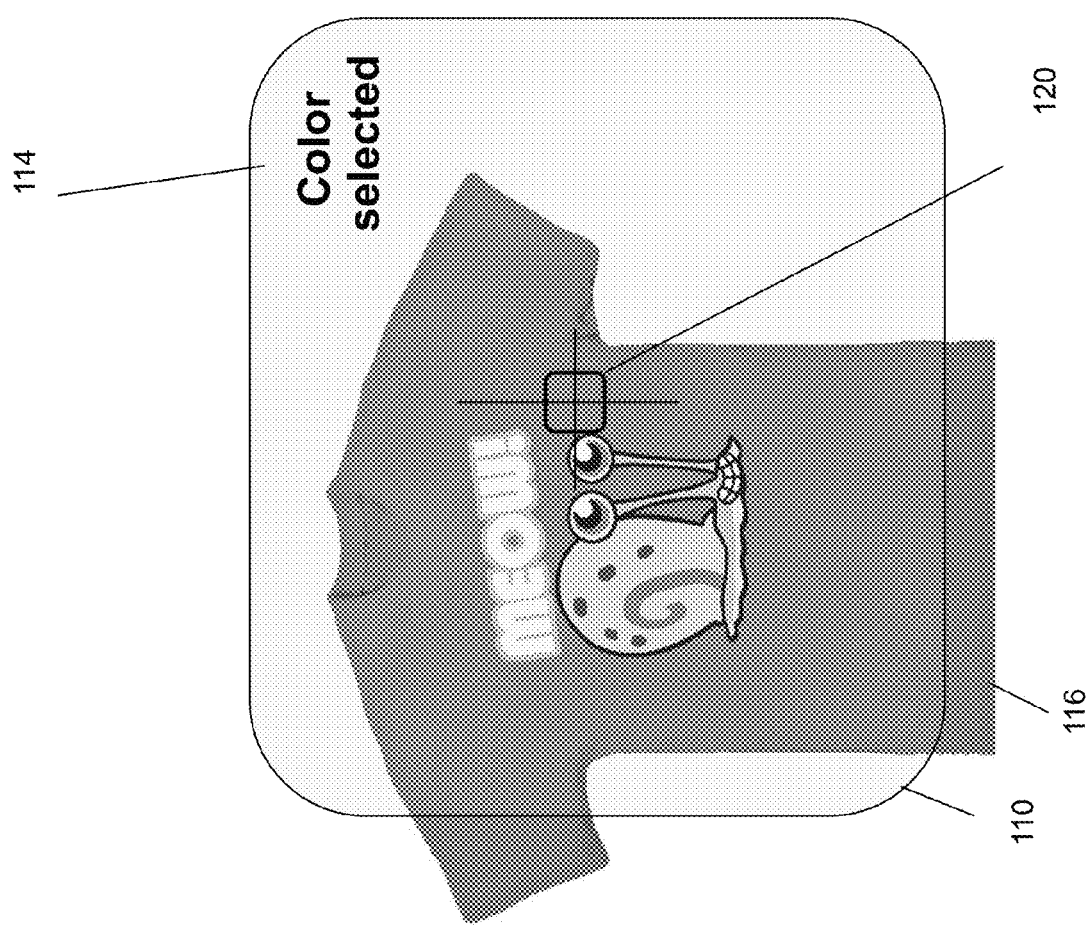

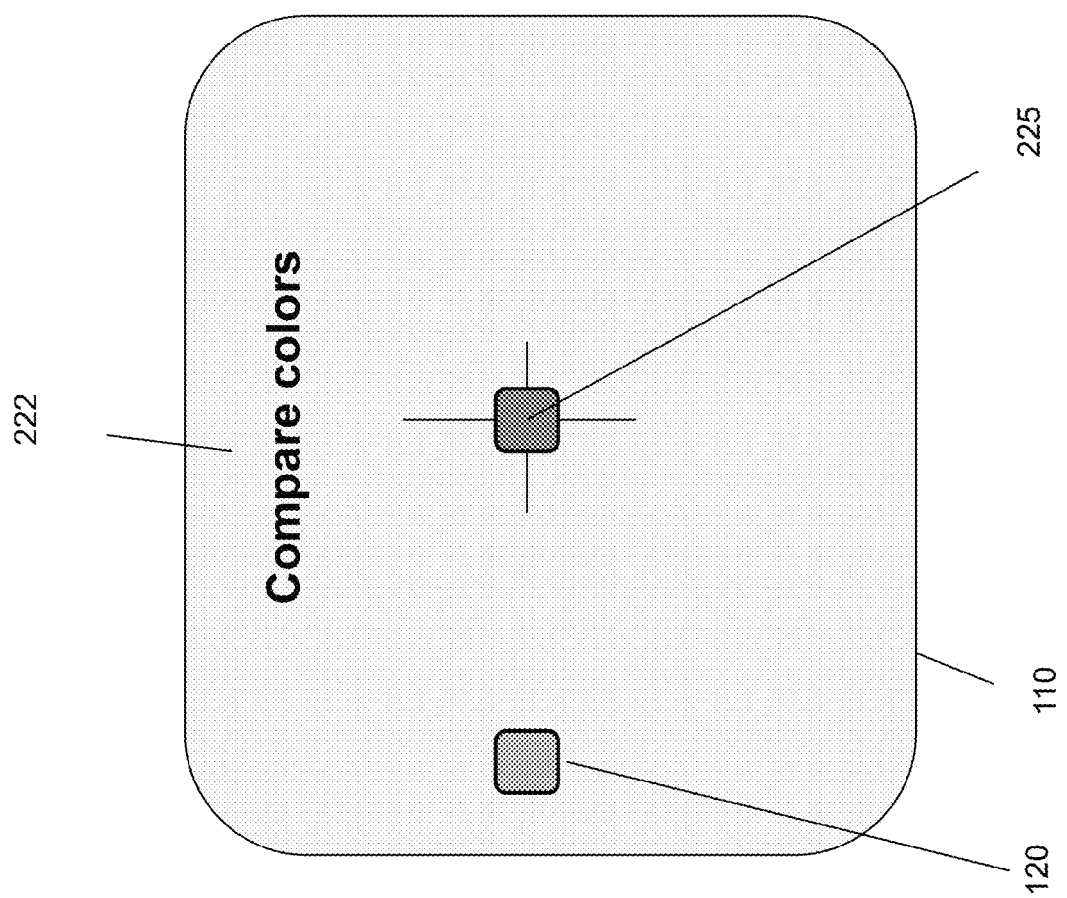

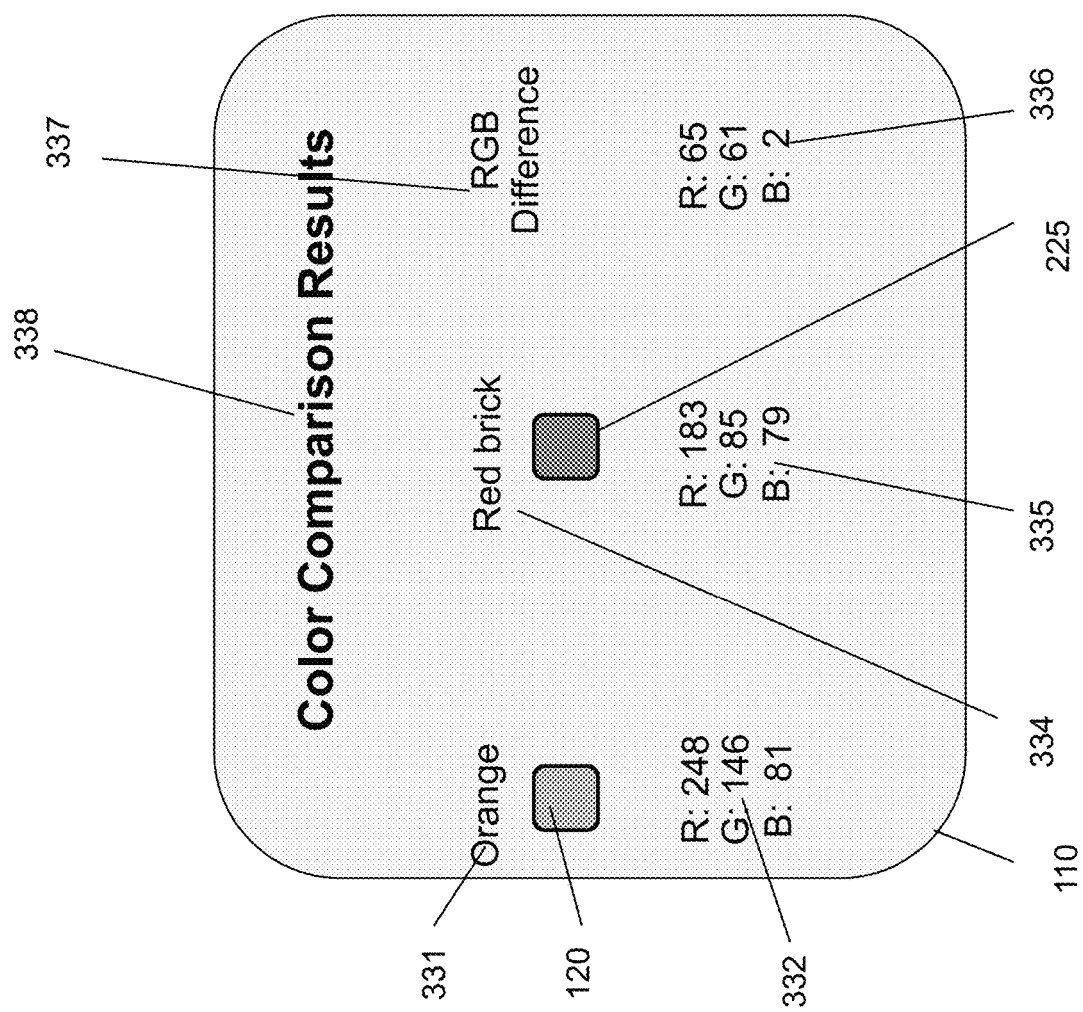

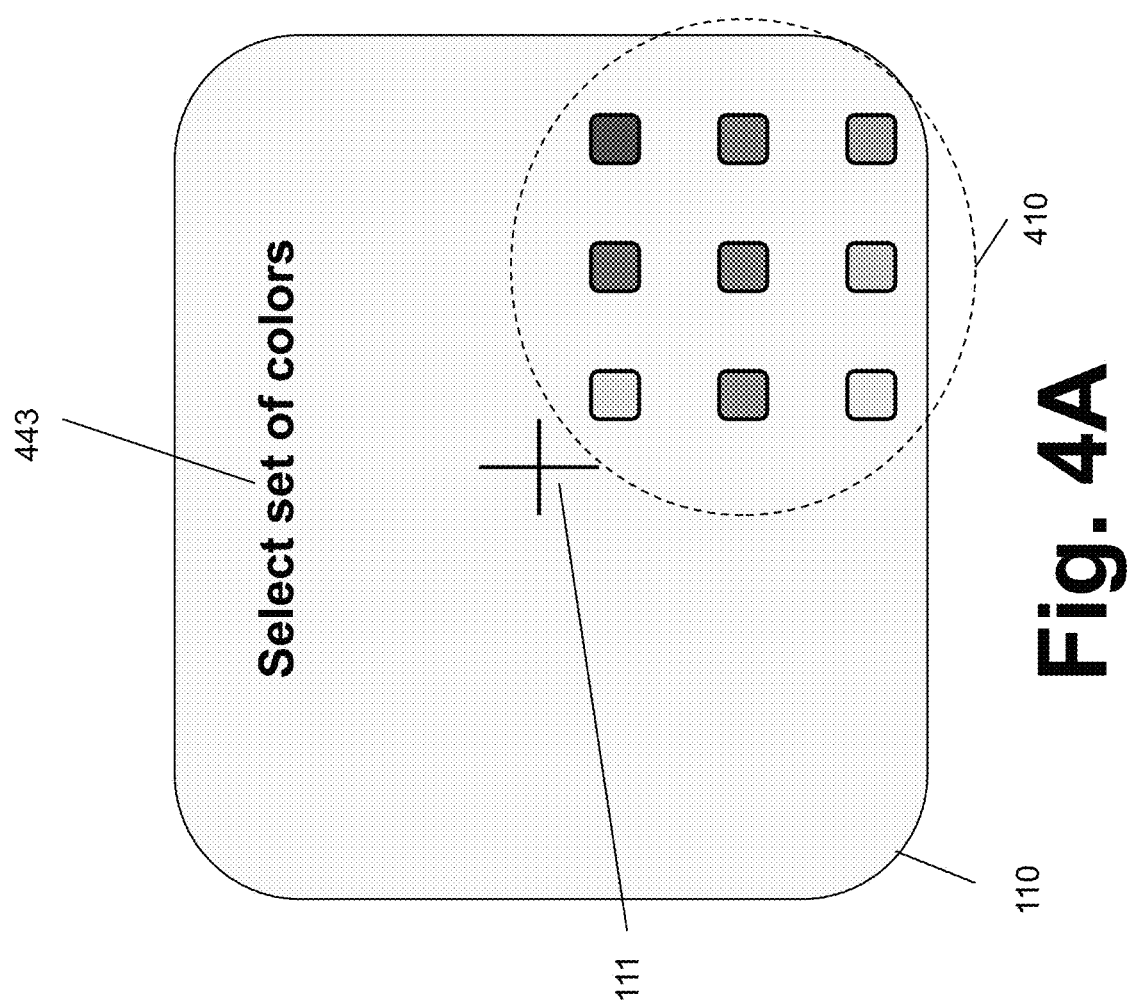

Fig. 4C

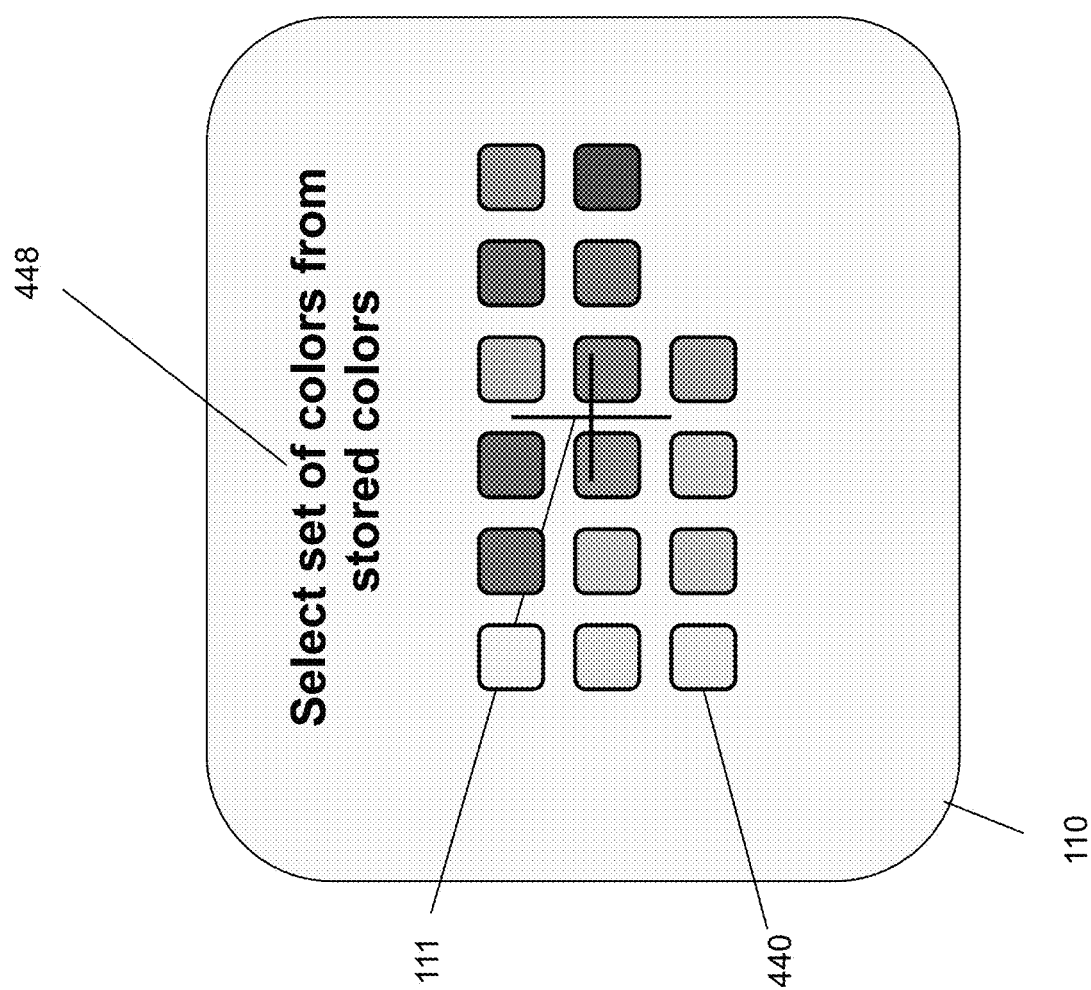

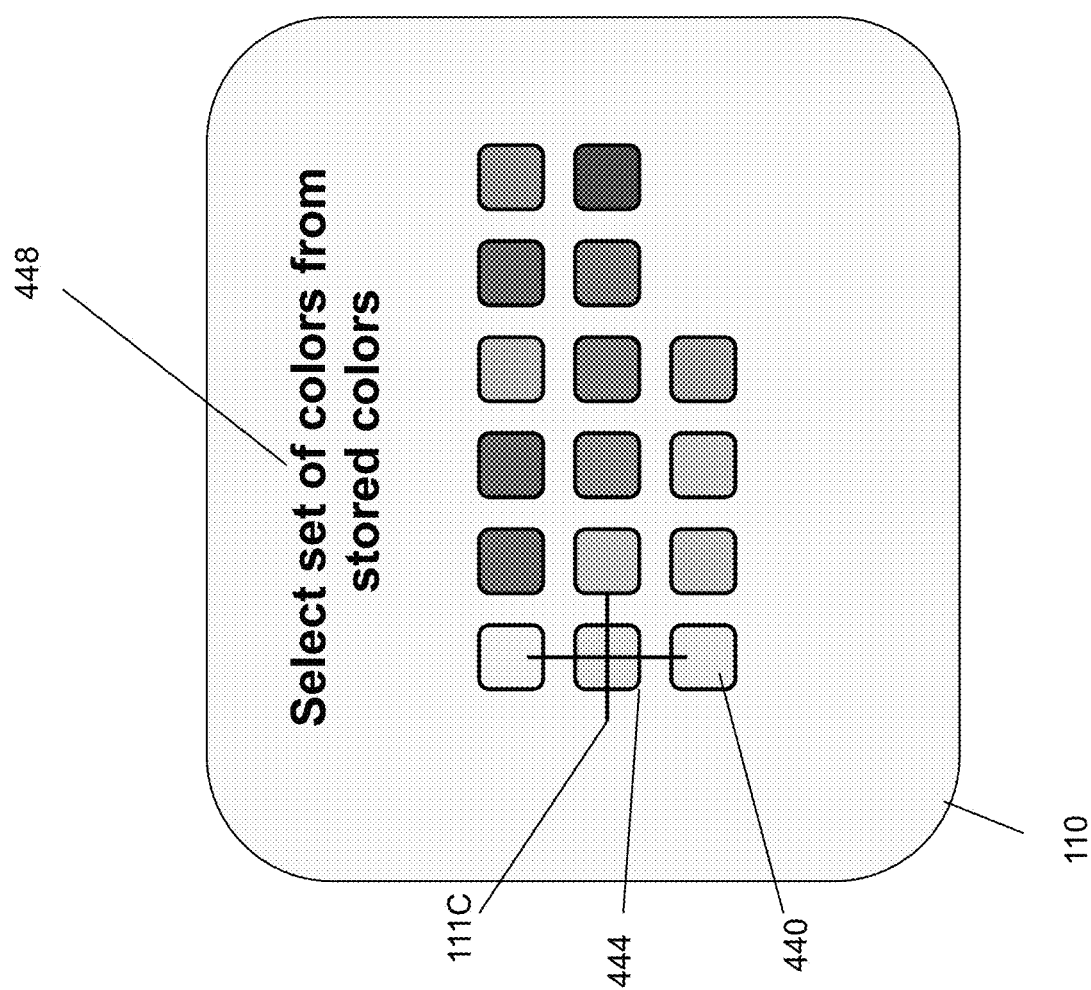

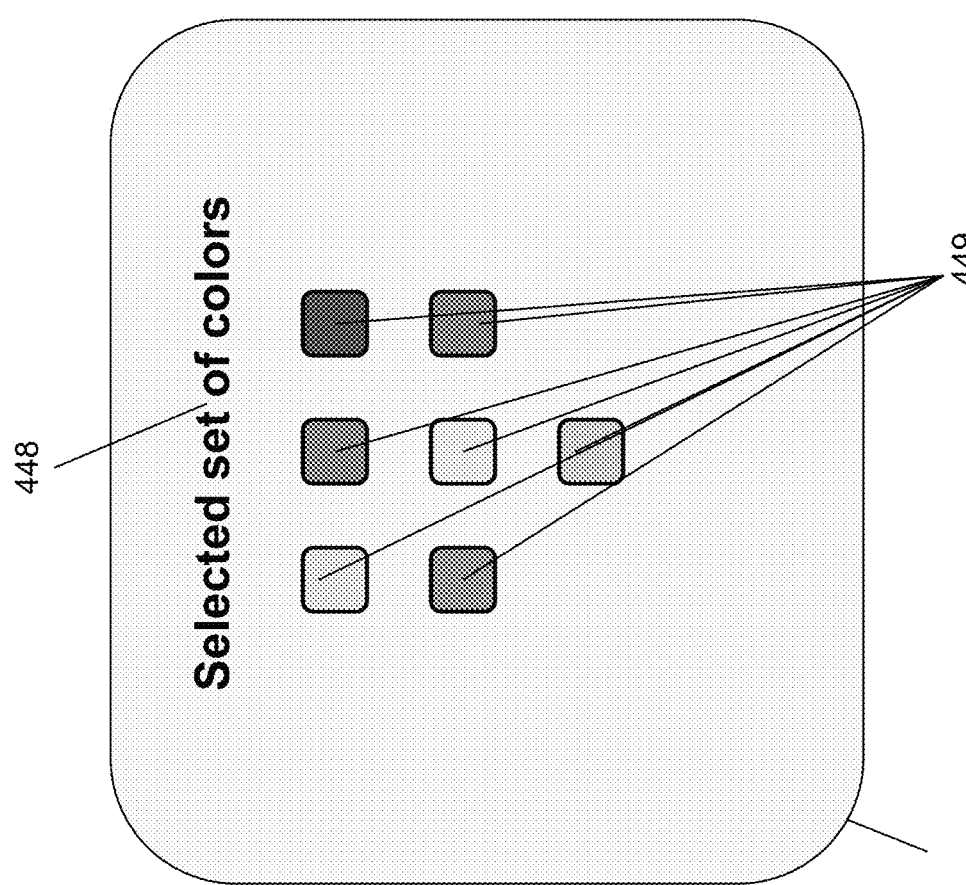

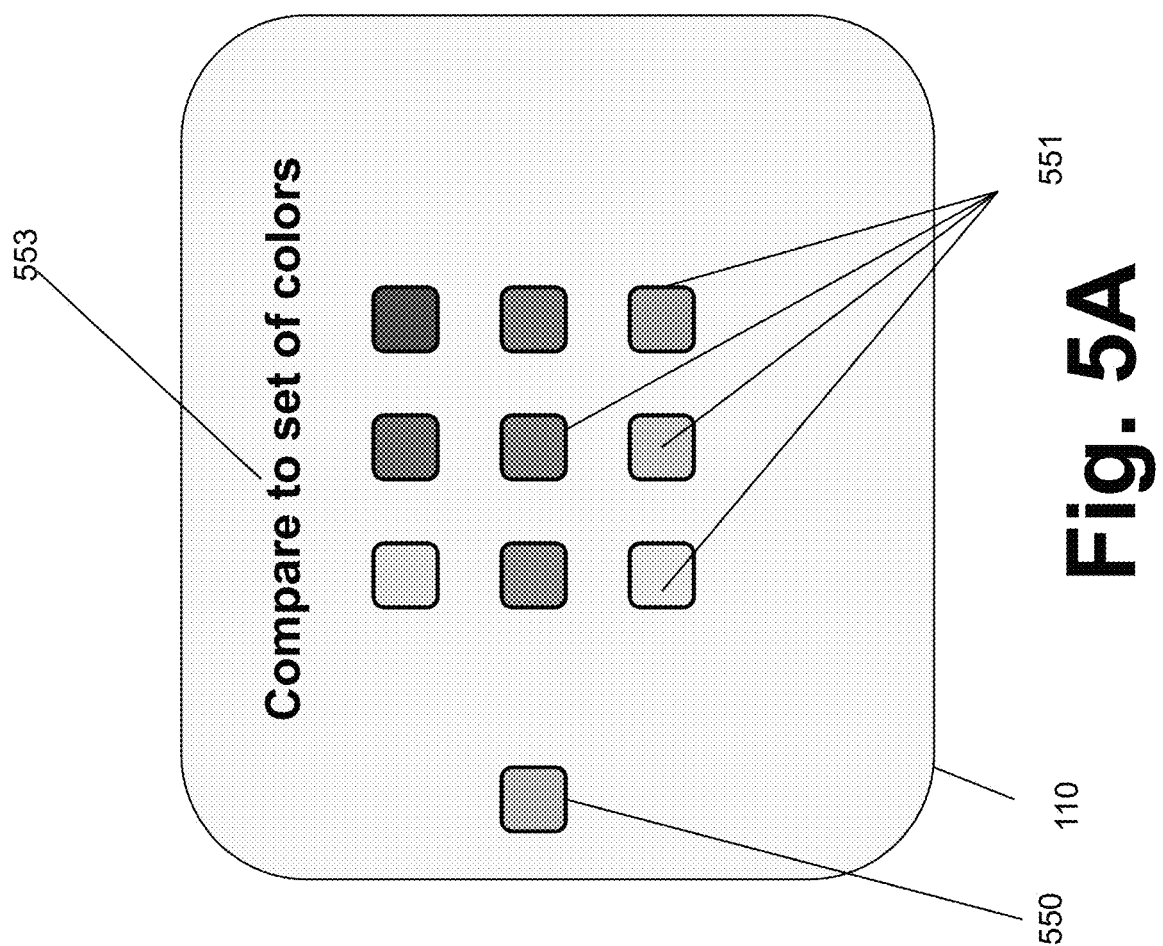

METHODS AND APPARATUS FOR ENHANCING COLOR VISION AND QUANTIFYING COLOR INTERPRETATION

CROSS REFERENCE TO RELATED APPLICATIONS

This non-provisional patent application is a continuation application claiming the benefit of U.S. patent application Ser. No. 14/675,719 entitled METHODS AND APPARATUS FOR ENHANCING COLOR VISION AND QUANTIFYING COLOR INTERPRETATION filed on Mar. 31, 2015 by Bernard Burg et al. U.S. patent application Ser. No. 14/675,719 claims the benefit of United States (US) Provisional Patent Application No. 61/973,208 entitled METHODS AND APPARATUS FOR ENHANCING COLOR VISION AND QUANTIFYING COLOR INTERPRETATION IN HEAD-MOUNTED-DISPLAY DEVICES filed on Mar. 31, 2014 by Bernard Burg et al.

Furthermore, this application is related to U.S. patent application Ser. No. 14/419,939 entitled METHOD AND APPARATUS FOR PERFORMING AND QUANTIFYING COLOR CHANGES INDUCED BY SPECIFIC CONCENTRATIONS OF BIOLOGICAL ANALYTES IN AN AUTOMATICALLY CALIBRATED ENVIRONMENT filed Feb. 6, 2015, which is incorporated herein by reference for all purposes. U.S. patent application Ser. No. 14/419,939 is a national phase application claiming priority to International Patent Ap. No. PCT/US2013/035397, filed on Apr. 5, 2013 by Bernard Burg et al. (hereinafter Burg '397), which is incorporated herein by reference for all purposes. This application is also related to U.S. patent application Ser. No. 14/633,513 entitled QUANTIFYING COLOR CHANGES OF CHEMICAL TEST PADS INDUCED BY SPECIFIC CONCENTRATIONS OF BIOLOGICAL ANALYTES UNDER DIFFERENT LIGHTING CONDITIONS filed on Feb. 27, 2015 by Bernard Burg et al., which is incorporated herein by reference for all purposes. U.S. patent application Ser. No. 14/633,513 claims the benefit of U.S. Provisional Pat. Application No. 61/948,536, filed on Mar. 5, 2014 by Bernard Burg et al. (hereinafter Burg '536), which is incorporated herein by reference for all purposes.

FIELD

The embodiments generally relate to color quantification.

BACKGROUND

Traditionally, color perception in humans is characterized as the color resolving capability of an average person. Practically the appearance of a perceived color can be dramatically affected by the human eye related issues and observed scene issues.

About 8% of men and 0.5% of women have some color perception limitation. Protanomaly is a reduction in the ability to perceive red, with the rare protanopia (1% in men) being the complete failure to see red. Deuteranomaly is the reduced perception of green (5% in men). Tritanomaly, the failure to see blue is extremely rare. Properties of the eye and retina incur changes in the color sensitivity also occur with age, including macular degeneration. Error in the perceived color of a sample is also exacerbated by the surrounding color. This is sometimes called 'color spreading' or 'simultaneous contrast' and is based upon the subjective judgment of a color changing with the nature and proximity of other colors. Metamerism is an artifact of the perceived color being assessed from the sum of the differential intensities in each of the three (or more) receptor sensitivity bands.

The spectrum of the illumination of scenes or objects can have a serious effect upon the image detected by the camera. The effects of illumination differs amongst camera and sensor types. The intensity of the illumination, which should naturally be spatially uniform across the entire area of observation, and calibration of test samples and witness panels, needs to exceed the noise threshold of the least effective (reflection, scattering, refraction, polarization, etc.) sample. The angle of the illumination and the viewing angle determine the reflection of the optical system. The material and textures of the object matter as the primary measurement is the spectral modulation of the illumination referred to as the objects apparent 'color'. What is desirable to know is what properties are changed between incidence and emission of the light. While the texture should be neither too smooth (specular) nor too rough (locally variable on an imaged pixel dimension), it should appear Lambertian (same brightness—and color—from all directions).

BRIEF SUMMARY

The disclosed embodiments are summarized by the claims that follow below. Briefly, the disclosed embodiments relate generally to systems and methods for detecting the presence or absence of a color in a camera field and to perform color vision, color recognition and color corrections. When in controlled lighting environments, color matching and color corrections are well mastered. However when operating in uncontrolled lighting environments the operations of performing color matching and color corrections are significantly more complex. The disclosed embodiments can: 1) compare colors under similar lighting conditions, 2) compare perceived colors to reference stored in memory and, 3) compare perceived colors or color variations to any static or kinetic abstract color models (color trajectories for each concentration, color trajectories in time etc.) stored or calculated, and, 4) calibrate and correct colors for different lighting conditions. Specific applications relate to methods for detecting the presence or absence of colors in color samples. These methods may be utilized by processors of head-mounted display devices, for example, to provide solutions to color-related applications. Quantified colors, color matches, color gradients and color differences displayed by a head-mounted-display device, for example, can enhance a user's visual capabilities. The color corrections can follow principles based on the human vision, including e.g., gamut and metamerism limitations and corrections for forms of daltonism; or alternatively can work with absolute color spaces like RGB, CMYK, Munsell, Pantone, and others that are independent of human eye properties.

BRIEF DESCRIPTIONS OF THE DRAWINGS

This patent or application file contains at least one drawing executed in color. Copies of this patent or patent application publication with color drawing(s) will be provided by the United States Patent and Trademark Office upon request and payment of the necessary fee.

FIGS. 1A-1C illustrate a display device of a head mounted display device displaying first selection user interface windows to select a first color sample of a first object for analysis.

FIG. 2C illustrates the display device of the head mounted display device displaying a comparison user interface window including the first color sample of the first object and the second color sample of the second object for comparison.

FIG. 3 illustrates the display device of the head mounted display device displaying a results user interface window including color comparison results between the first color sample of the first object and the second color sample of the second object.

FIGS. 4A-4B illustrate a zone selection method to select a set of colors of a set of color samples.

FIG. 4C illustrates a color chart including a table of a plurality of colors of color samples from which a set may be selected.

FIGS. 4E-4G illustrate a recall of a set of memorized colors stored in a memory of the head-mounted display device and selection thereof to form a set of selected colors for further processing.

FIG. 5A illustrates a comparison window displayed by a display device to compare a color of a single color sample to a set of colors in a set of color samples.

Figure 8:
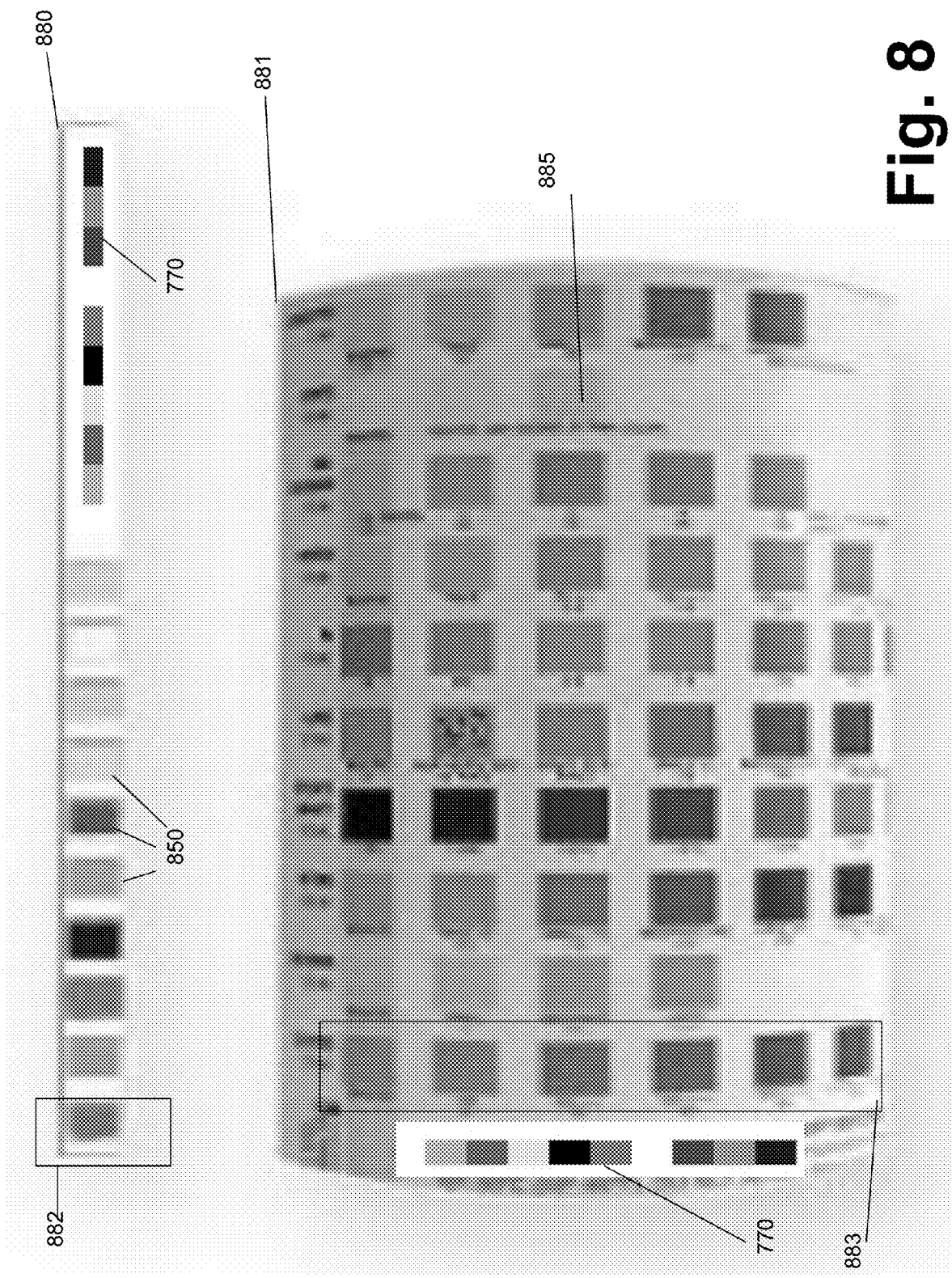
Figure 9:
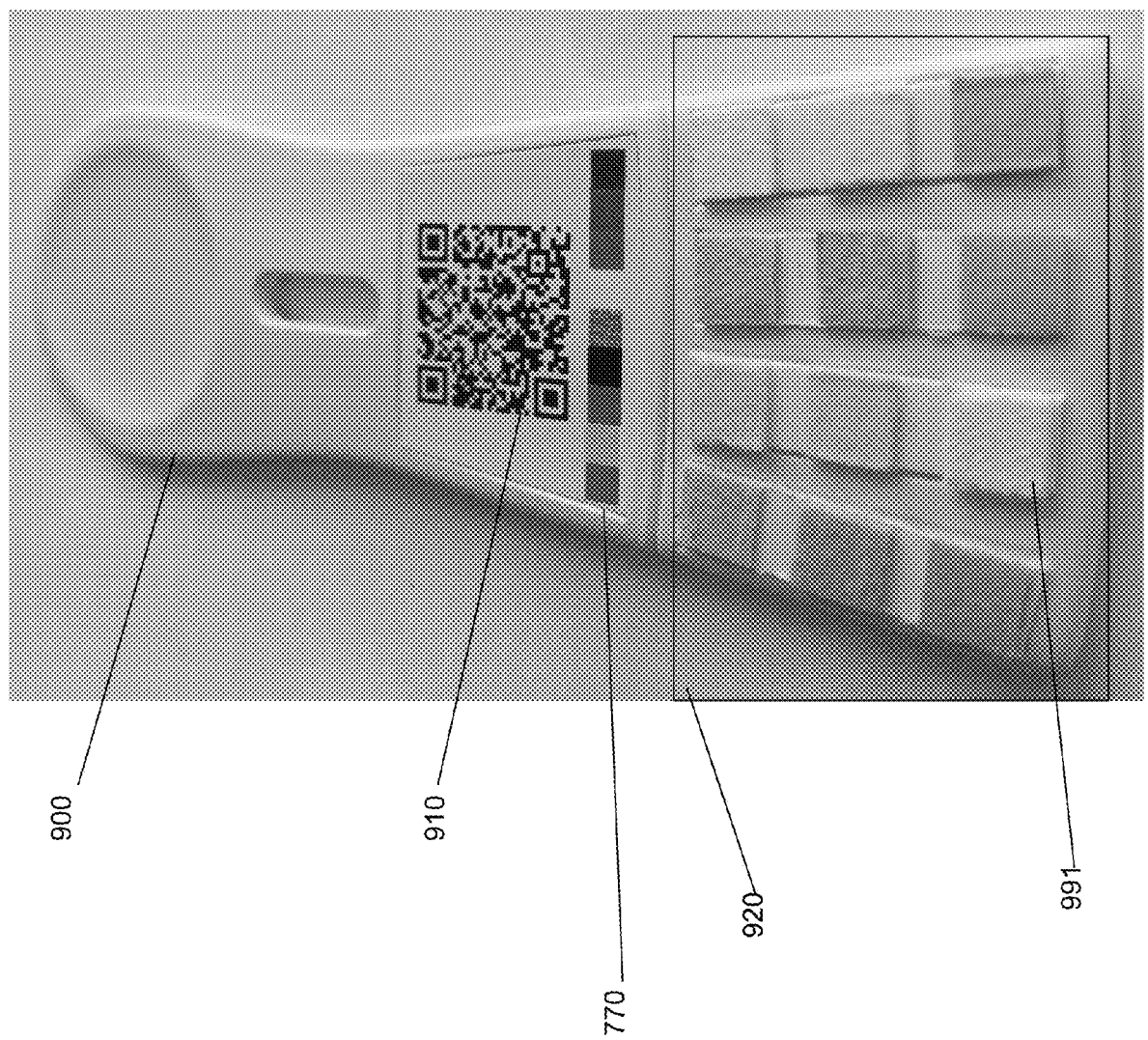

FIG. 8 illustrates a reagent dipstick and a color chart with a set of reference colors that can be compared by the embodiments to determine analyte concentration FIG. 9 illustrates a test paddle with reagent test pads and a color reference bar that may be used to automatically correct captured colors of the reagent test pads prior to color comparison with a set of color calibration curves to determine analyte concentration.

Figure 10:
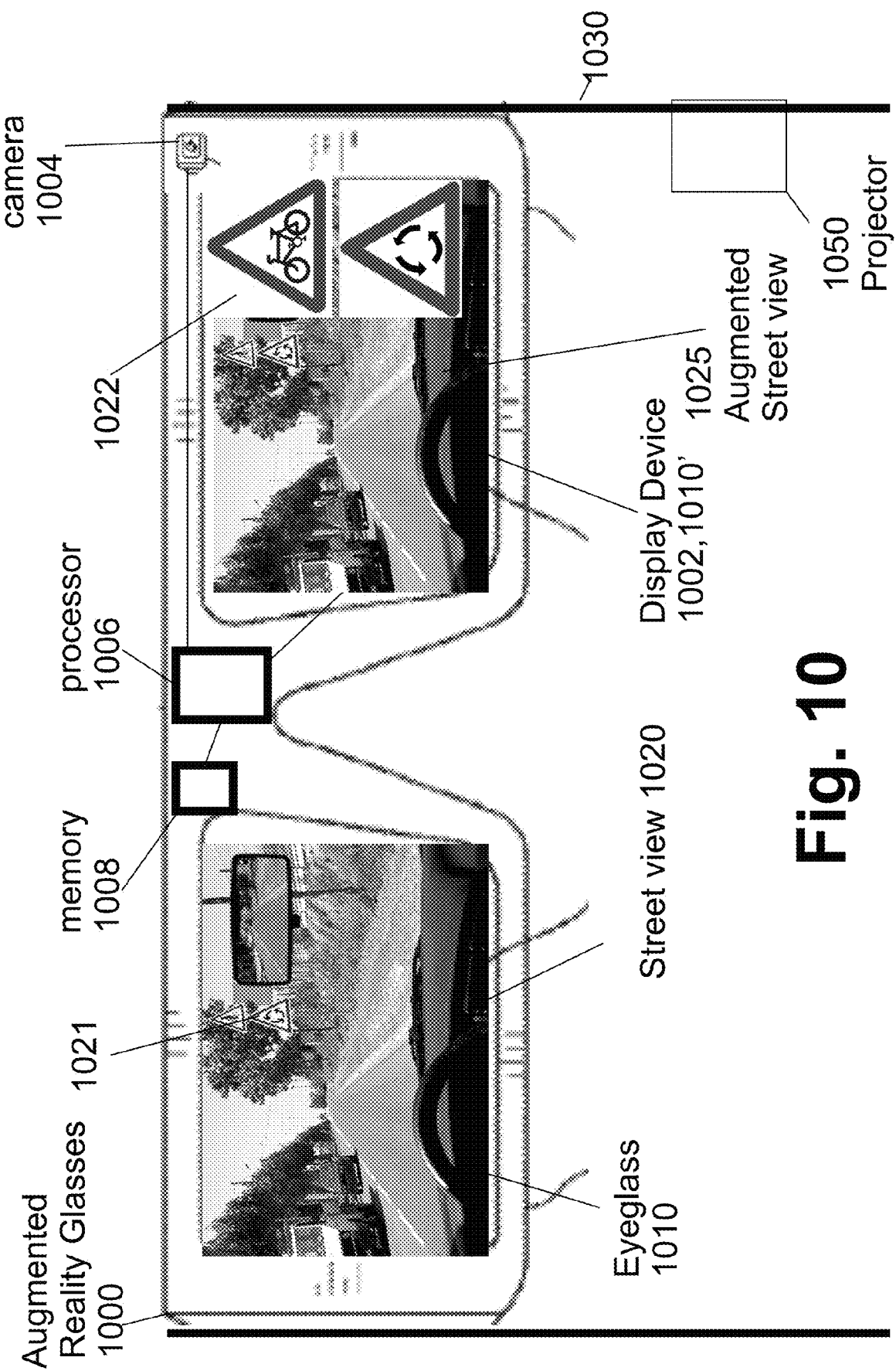

FIG. 10 illustrates a diagram of augmented reality glasses executing an application to extract and enhance images of street signs.

Figure 11:
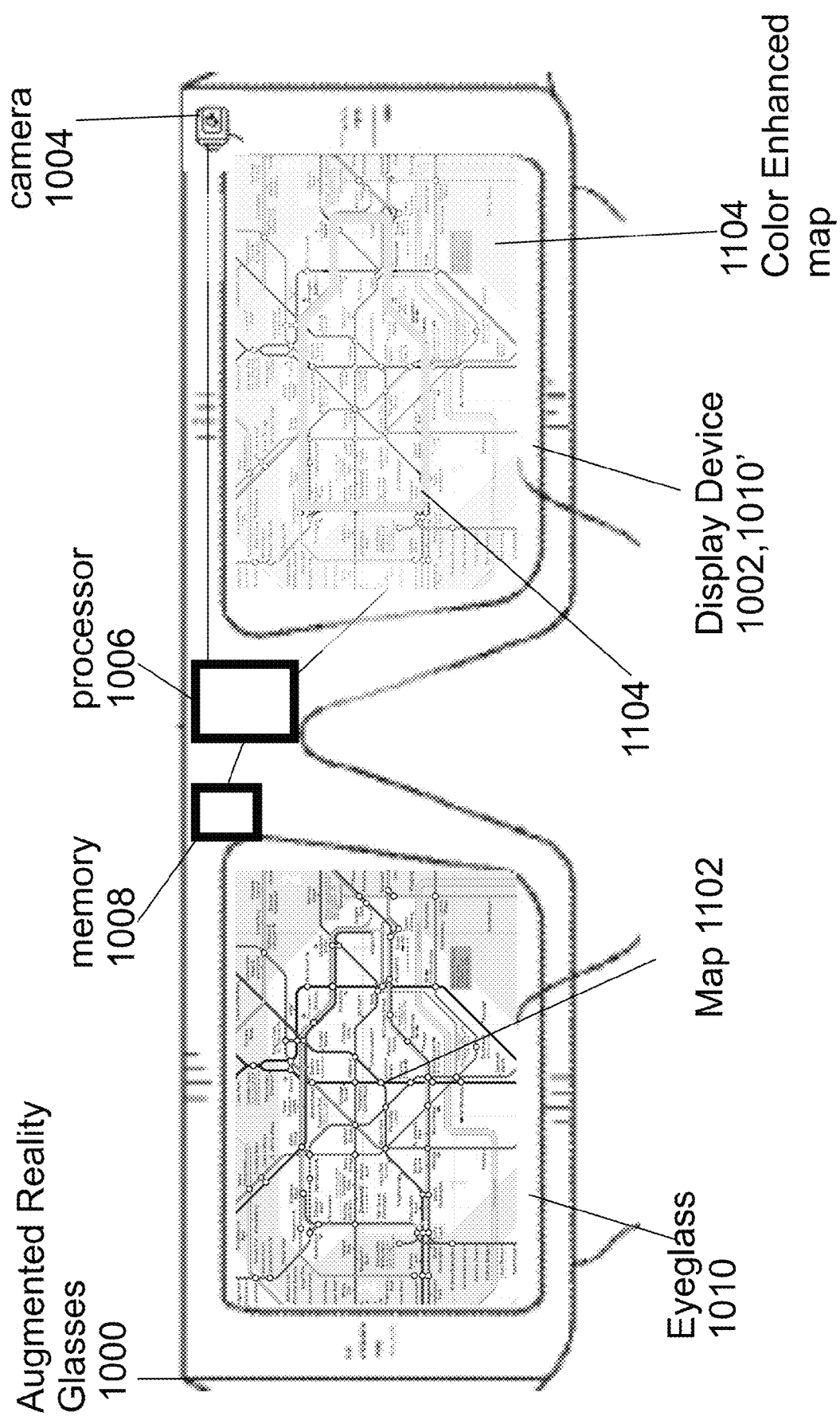

FIG. 11 illustrates a diagram of augmented reality glasses executing an application to extract and enhance images of color maps.

Figure 12:
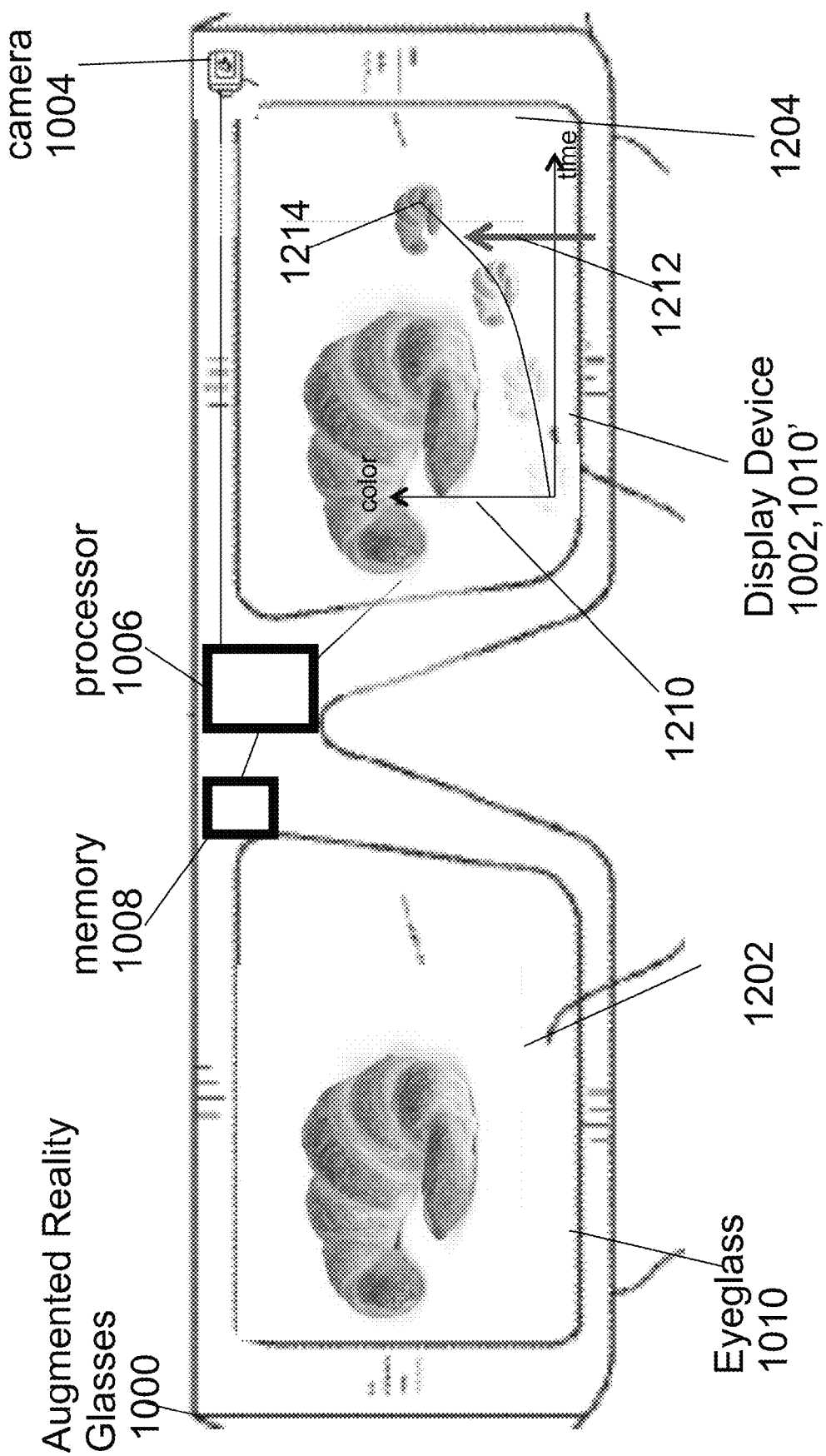

FIG. 12 illustrates a diagram of augmented reality glasses executing an application to compute and display color gradients of a baked good or cooked food undergoing a baking or cooking process and a color gradient chart for comparison with a color gradient curve.

DETAILED DESCRIPTION

In the following detailed description of the disclosed embodiments, numerous specific details are set forth in order to provide a thorough understanding of the embodiments. However, it will be obvious to one skilled in the art that the disclosed embodiments may be practiced without these specific details. In other instances well known methods, procedures, components, and circuits have not been described in detail so as not to unnecessarily obscure aspects of the disclosed embodiments.

The disclosed embodiments include methods, apparatus and systems of color vision tools. In some embodiments, the color vision tools can be used to detect and quantify color changes induced by specific concentrations of biological analytes in an automatically calibrated environment.

Head-Mounted-Displays

There are several ways to augment the reality of a user's vision. In video gaming and virtual reality settings, users may wear an opaque head-mounted display where the reality is recomposed digitally on digital display screens, including a visual feed of images captured by a camera with digital additions to augment this reality.

Figure 6:
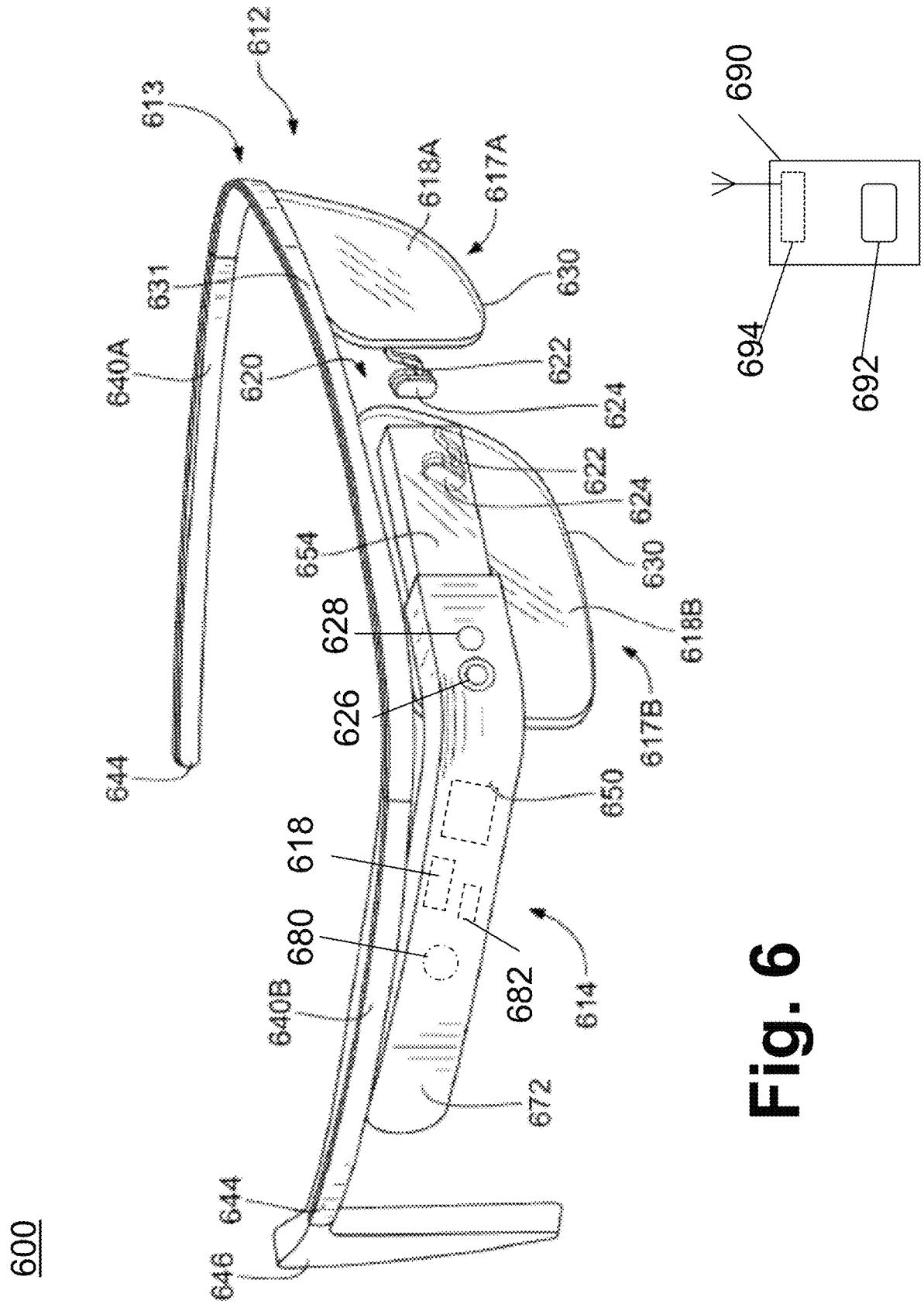
FIG. 6 illustrates an exemplary head-mounted display device that can display a cross hair and user interface instructions on a display device.

Referring now to FIG. 6, a perspective view of an exemplary head-mounted display device 600 is shown. The head-mounted display device 600 includes a frame 612 with left and right assemblies 617A,617B and a pivotal display boom 614. The pivotal display boom 614 is pivotally coupled to the frame 612 at a pivotal joint 672. The pivotal display boom 614 can be pivoted up out of the way of the left and right assemblies 617A,617B if desired. The pivotal display boom 614 can be affixed to either one of the arms 640A or 640B of the frame 612 to position a display device 654 in the view of one of the user's eyes.

The pivotal display boom 614 includes a processor 650, the display device 654, a camera 626, and an optional sensor 628 coupled to the processor by wires or circuitry within the display boom 614. The pivotal display boom 614 may also include a storage device as part of the processor 650 or a separate storage device 618, such as a memory device. The storage device 618 stores software and/or firmware instructions for execution by the processor 650 to provide the user interface and perform the functions of the methods described herein. To obtain a more central point of view, the camera 626 can alternatively be mounted to the frame 612, such as on a bridge or near a central portion of the frame 612.

The camera 626 can be used to take picture or record a video at the user's discretion. The camera 626 can also be used by the device to obtain an image of the user's view of his or her environment to use in implementing augmented reality functionality. The sensor 628 is a sensor associated with the camera 626, such as a light sensor for example, that can be used by firmware and/or software to improve the quality of the images captured by the camera 626.

The pivotal display boom 614 may also include a radio 682 to be in wireless communication with a radio 694 of a user input device 690. The user input device 690 includes a touchpad 692 with one or more buttons that can be selected to control the functions of the head-mounted display device 600. Alternatively or additionally, the pivotal display boom 614 may include a microphone 680 coupled to the processor 650 to receive voice commands that are recognizable by the head mounted display device 600. The voice commands are user inputs that are used to control the functions of the head-mounted display device 600.

The frame 612 includes a band 613 with temples or arms 640A-640B and a central portion 631 and a bridge 620. The frame 612 may further include left and right rims 630 detachably coupled to the band 613. A bridge arm 622 with a pad may be coupled to the rims 630 to support the device on the nose of a user. The left and right arms 640A-640B mount over a users left and right ears to further support the device 600. Band 613 can be configured to fit on the head of a user with the central portion 631 positioned over the brow of the user and supported in a position there over by pads 624 that contact the nose of the wearer.

The frame 612 may further include one or more earpieces 646 coupled to the ends 644 of the temples or arms 640A-640B. A battery (not shown) may be housed in one or both of the earpieces 646 to provide power to the internal electrical components of display boom 614. A wire may routed through a channel or hollow passage in the arms 640A-640B and center portion 631 to the display boom 614. A battery may alternatively be housed in the display boom 614 itself to provide power to the electrical components therein and avoid using a wire routing through the frame to the batteries.

The left and right assemblies 617A,617B may include a lens 613A,613B mounted in the rims 630. Lens assemblies 617A,617B can attach to central portion 631 by various snap-fit or press-fit arrangements or can be removeably affixed using screws or the like.

A portable user interface device 690, such as a smartphone or tablet computer, may be in wireless communication with the head-mounted display device 600. The portable user interface device 690 includes a touchpad 692 to receive user inputs and control the functions of the head-mounted display device 600.

Some disclosed embodiments provide a method and apparatus to address a user's eye deficiencies and display an augmented reality that includes color matches, color corrections, and color measurements in a head-mounted display, such as head-mounted-display device 600 for example, without disconnecting the user's eyes from its environment.

Comparing Two Colors Under Same Lighting

The application executed by the processor of the head mounted display device can enter into a color comparison mode by means of a touchpad command or a voice command.

Referring now to FIG. 1A, a display device 110 in a head-mounted display device, such as the display device 654 of the head mounted display device 600 illustrated in FIG. 6, displays a crosshair 111 in the middle of the display screen. A user interface of the head-mounted display device displays instructions 112 on how to the use head-mounted display device. For example, the user interface displays the instruction 112 to select a target area of color. A user may move his head and the display device 110 so that the crosshair 111 is aligned over a first object of a first color for selection of a first color sample.

In FIG. 1B, the user has moved his head with the head-mounted display device such that the crosshair 111 displayed in the display device 110 is aligned over a first object 116 of color, such as a t-shirt for example. A selection user input, such as a button pressed within a touch pad 692 or a spoken voice recognizable command received by a microphone 680, for example, may be used to select and capture the color under the cross hair within a target area.

Figure 2A:
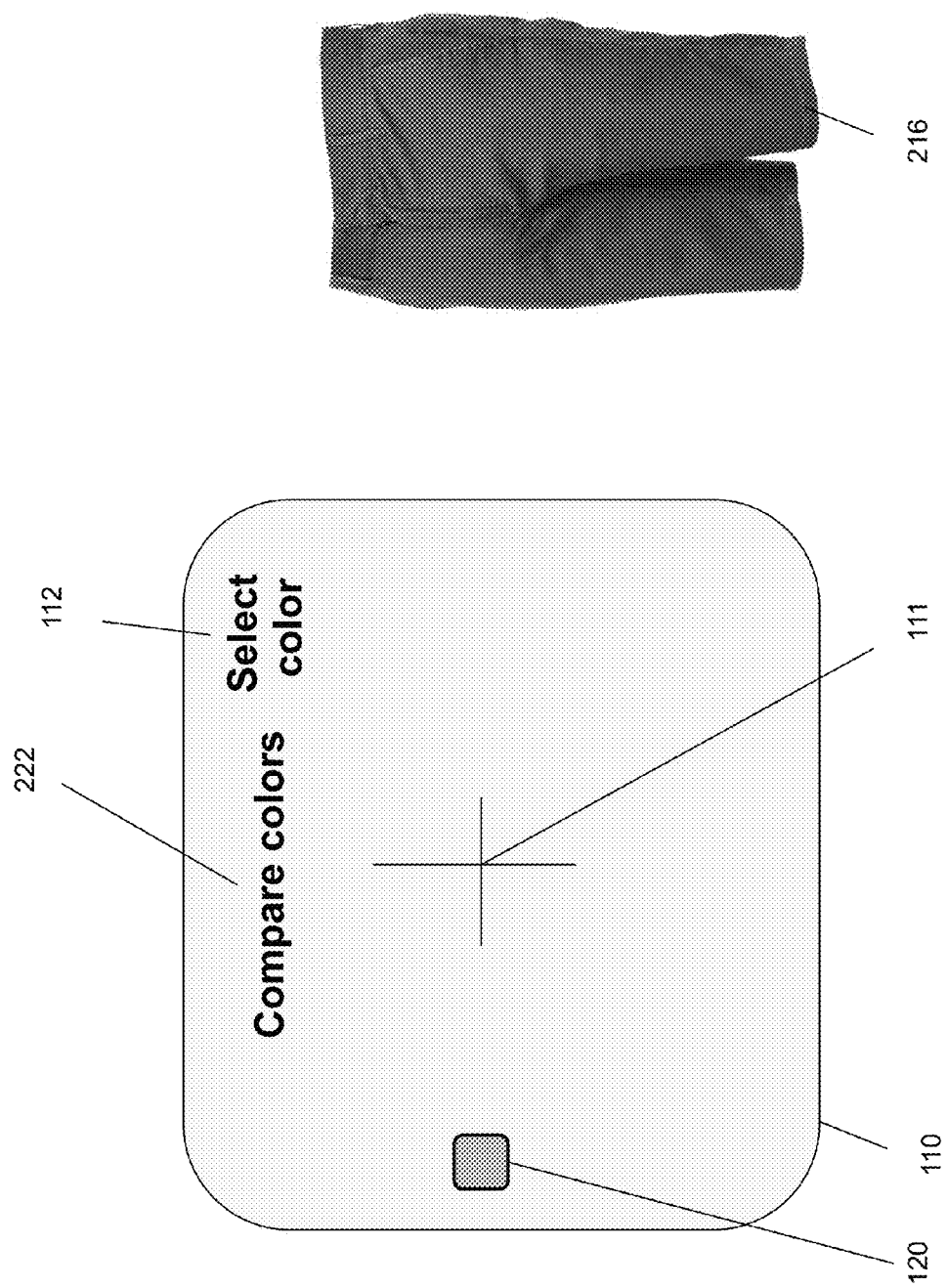
FIGS. 2A-2B illustrate a display device of a head mounted display device displaying second selection user interface windows to select a second color sample of a second object for analysis.

Reference is now made to FIG. 1C. Within a predetermined target area under the cross-hair 111, a first targeted color (first color sample) 120 of the first object 116 has been selected by the user. The captured color is temporarily stored in memory. The first targeted color (first color sample) 120 within the target area may be subsequently displayed near an edge of the display device 110, such as shown in FIG. 2A. A storage user input, such as another voice command or button selected within a touchpad 692, can be used to non-volatilely store the selected color in a storage device, such as the memory 618, so that it can be reused later.

After selection of a first color sample, a second color sample of a second object of a second color may be selected in order to compare first and second colors.

Referring now to FIG. 2A, a second selection user interface window is shown such that a similar selection process can be used to capture a second target color of a second object for the purpose of comparison with the first target color of the first object. The previously selected target color, the first target color 120, is shown displayed near a side of the selection user interface window on the display screen. An operational status 222 is indicated by the user interface in a top portion of the selection user interface window on the display device 110. The operational status 222 in FIG. 2A illustrates a compare colors mode. A user instruction 112 displayed in the selection user interface window by the display device instructs the user to select color as the second target color for comparison with the first target color 120.

Figure 2B:
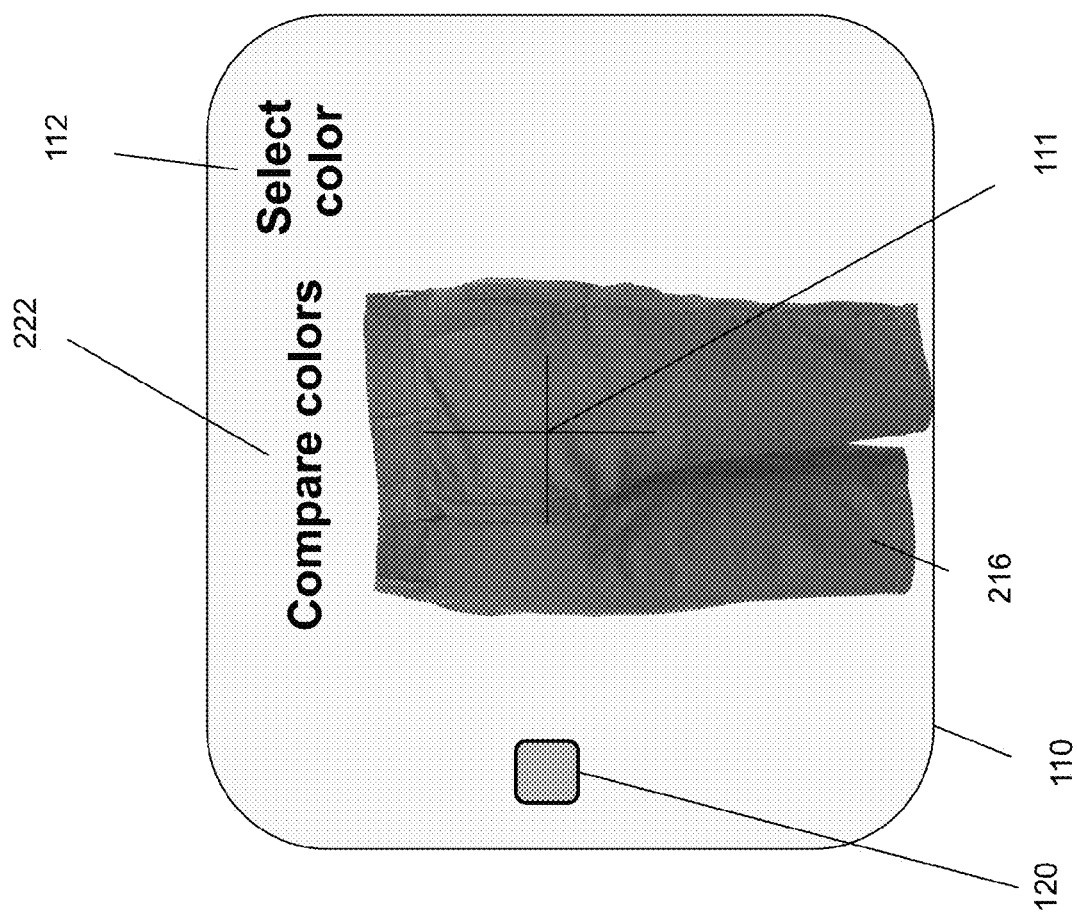

Referring now to FIG. 2B, the user moves his head with the head-mounted display device such that the crosshair 111 displayed in the second selection user interface window is aligned over a second object 216 of color, such as pants for example. A selection user input is used to select and capture the color under the cross hair within a target area.

Referring now to FIG. 2C, after selection of the second targeted color 225 of the second object 216, the display device 110 displays a comparison window. Within a predetermined target area under the cross-hair 111, a second targeted color (second sample color) 225 of the second object 216 has been selected by the user. For visual comparison, the first target color (first sample color) 120 and the second targeted color (second sample color) 225 are displayed in the comparison user interface window on the display screen. These are the color samples that are to be compared by the processor. The display device continues to display the current operational status 222 of the head-mounted display device in FIG. 2C, a compare colors mode.

The processor of the head-mounted display device, such as processor 650, performs a comparison between the captured colors in the selected first targeted color 120 and the selected second targeted color 225.

There are several comparisons that can be made between colors by the processor. Values of color are often defined by the chosen color space used to represent the visible color range of the electromagnetic spectrum.

One common color space is the red-green-blue (RGB) color space that is an additive color space. The RGB color space is defined by the three chromaticities of the red, green, and blue additive primaries, and can produce any chromaticity that is within a triangle defined by the primary colors. A complete specification of an RGB color space includes a white point chromaticity and a gamma correction curve. For example, a standard red-green-blue (sRGB) color space has a D65 white point and a CRT Gamut. The RGB (Red Green Blue) range of color space covers a fraction of the eye's visible color gamut.

Another common color space is the cyan, magenta, yellow, and key (CMYK) color space that is a subtractive color model, often used in color printing, and is also used to describe the printing process itself. The acronym CMYK refers to the four ink colors that are used in some color printing cyan, magenta, yellow, and key (black). Another common color space is YCBCR. YCbCr is a family of color spaces used as a part of the color image pipeline in video and digital photography systems. Y' is the luma component and $C_B$ and $C_R$ are the blue-difference and red-difference chroma components.

Other coordinate values in other color spaces may also be used with the embodiments, such as L*a*b* coordinates in the International Commission on Illumination (CIE) CIE76 color space, L*a*b* coordinates in the International Commission on Illumination (CIE) CIE94 color space; and three color cones of a long, medium, and short (LMS) wavelength responsivity color space.

While these other color spaces may be used, the RGB color space is easier to use to explain how to make color comparisons. A camera typically captures RGB color pictures, by superposition of filters to capture each of the red, green, and glue primary color components. Accordingly, the red, green, and blue color values (as well as other color space values) are readily available from an image captured by a typical camera without much conversion, if any. The human eye works in the RGB color space with R, G and B color rod sensors. Chemical test pads on test paddles and test strips have been developed to be interpreted by the human eye, as such colors should be differentiated by the eye despite human perception artifacts. The RGB color gamut or range covers a larger zone than CMYK. Hence A larger color gamut allows for better color recognition.

Amongst several comparisons that can be made between colors by the processor, a comparison between first RGB values of the first targeted color 120 and second RGB color values of the second targeted color 225 can be performed.

The processor first analyzes the color in each of the selected/captured first targeted color 120 and second targeted color 225. The processor 650 determines color values for red (R), green (G), and blue (B) that can be additively combined together to make up each color of the first targeted color 120 and the second targeted color 225. In accordance with some embodiments, when a color is viewed by a user it analyzed by a processor and identified with the name of the color (color name) being displayed in the user interface window for viewing by the user. In response to the RGB color values determined from the targeted colors, the processor associates a color name with each. For example, the processor may associate the color name of orange to the first targeted color. In response to the RGB color values determined from the targeted colors, the processor then compares the RGB color values for the first targeted color 120 against the RGB color values of the second targeted color 225. The processor can then display the results of the comparison in a results user interface window on the display device 110 to the user.

Referring now to FIG. 3, the display device 110 displays the results user interface window of the color comparison between the selected first targeted color 120 and the selected second targeted color 225. The results user interface window includes the current operational status, a status of color comparison results 338. In the results user interface window, the first targeted color 120 of the first object is associated with a first color name 331 (orange in this example) and first red-green-blue (RGB) color levels 332 (R:248, G:146, B:81 in this example). Similarly, the second targeted color 225 of the second object is associated with a second color name 334 (red brick in this example) and second RGB color levels 335 (R:183, B:85, B:79 in this example).

As mentioned herein, a comparison between first RGB values of the first targeted color 120 and second RGB color values of the second targeted color 225 can be performed by the processor. A difference between the RGB color values is calculated by the processor by subtracting each respective red, green, and blue value of the second targeted color 225 from each respective red, green, and blue value of the first targeted color 120. For example, a blue difference value of two is determined by subtracting a blue value of seventy-nine of the second targeted color from a blue value of eighty one of the first targeted color.

The results of the difference in RGB values can be displayed in the comparison results window. In the color comparison results window shown in FIG. 3, the RGB difference values 336 between the first RGB values of the first targeted color 120 and second RGB color values of the second targeted color 225 are displayed under an RGB difference legend 337.

An exemplary application for color matching/comparison is when a user shops for clothes. A plurality of articles of clothing may be compared for color matching/contrasting in the same store under the same lighting conditions. For example, color of a shirt 116 shown in FIG. 1B can be compared or matched/contrasted to the color of pants 216 such as shown in FIG. 2A. The color matching/comparison can also be performed under different lighting conditions. Storage devices, such as a memory, can store one or more colors of a pre-existing cloth stored in a storage location, such as in a cupboard or closet in ones home. A processor can then compare the stored colors from ones home under one lighting condition with colors of clothes in a shop under different lighting conditions when shopping for a new article of clothing or cloth.

Another example application of color matching and comparison is in the selection of fruit at a grocery store. Different fruits may exhibit different colors. The same fruit may also exhibit different colors based on ripeness or age. A fruit of a given color viewed by a user may be compared with stored fruit colors to allow proper selection of fruit type and age or ripeness. The stored fruit colors allow selection of fruit of the same color.

Selecting Sets of Colors

In accordance with a number of embodiments, colors can be compared to sets of colors. There are a number of ways of selecting sets of colors for comparison.

A first method of set selection of colors is for a user to open a set selection mode in the augmented reality glasses or head mounted display device with a voice command or a click on touchpad of a wireless device in communication with the augmented reality glasses or head mounted display device. Similar to selecting a first color sample and a second color sample described previously with reference to FIGS. 1A-1C and 2A-2B, the user can select two or more colors samples one at a time to form a set of selected color samples. A voice command or a button selection/click on touchpad can be used to then close the set of selected color samples when the user is finished doing so. A subsequent comparison of the set of selected color samples may be made after closing the set.

Figure 4B:
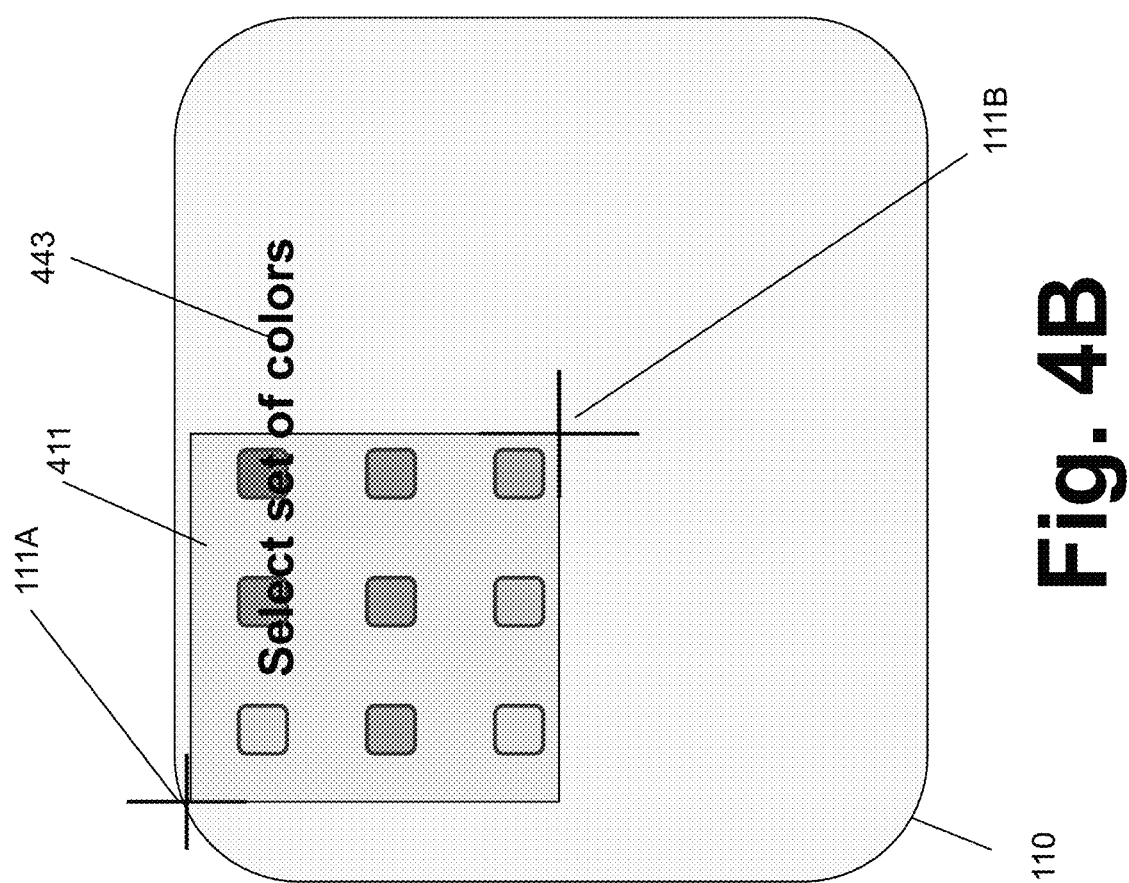

Referring now to FIGS. 4A-4B, a second method of set selection of colors is based on a zone selection method using the head-mounted-display device is now described. In FIG. 4A, a plurality of color samples 410 are desired to be selected as a set of colors for comparison. A voice command/touchpad click causes the augmented reality glasses or head mounted display device to enter into a zone selection mode for selection of a set of colors. Instructions 443 for performing zone selection of a set of colors are displayed on the display device 110 by the user interface.

The user is instructed by the instruction 443 to select a set of colors. The user moves the augmented reality glasses or head mounted display device to optically align the crosshair 111 of the display device 110 at a first corner 111A of a selection zone 411, such as the upper left hand corner of the plurality of color samples 410. The user then selects the first corner 111A of the selection zone by validating the position with a voice command/touchpad click on a touchpad.

Referring now to FIG. 4B, the user moves the augmented reality glasses or head mounted display device to optically align the crosshair 111 of the display device 110 at a second corner 111B of the selection zone 411, such as the bottom right corner of the plurality of color samples 410. The user then selects the second corner 111B of the selection zone 411 by validating its position with a voice command/touchpad click on a touchpad.

Figure 4C:
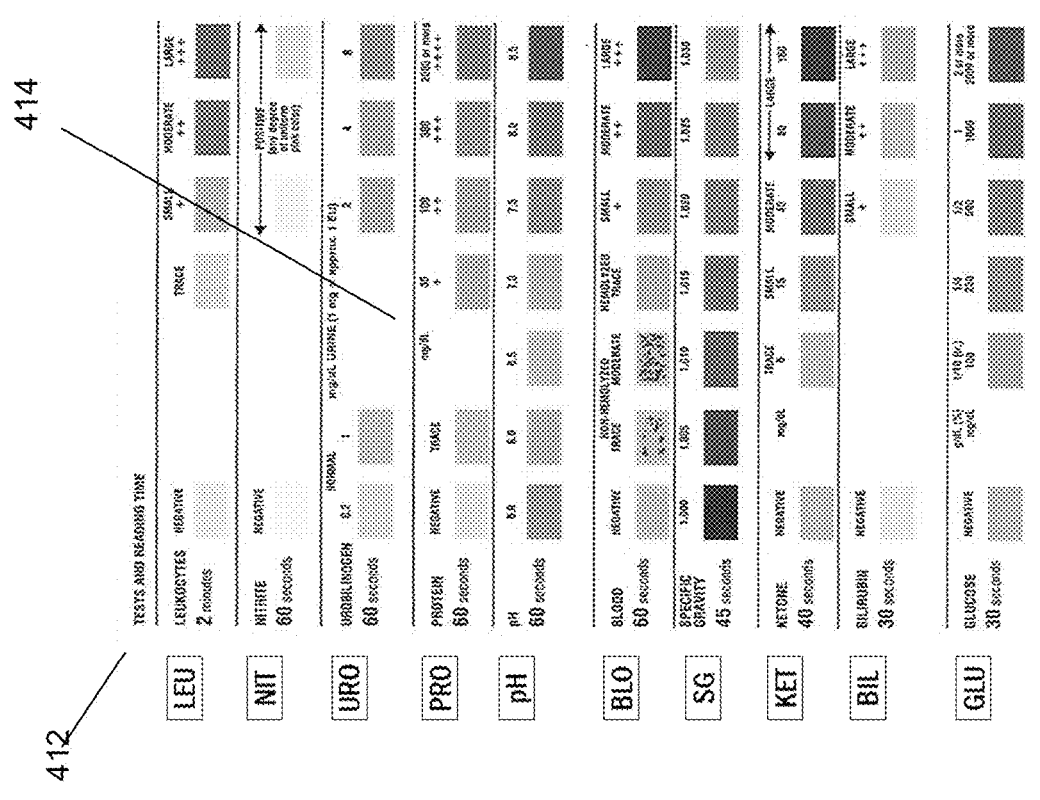
Figure 4D:
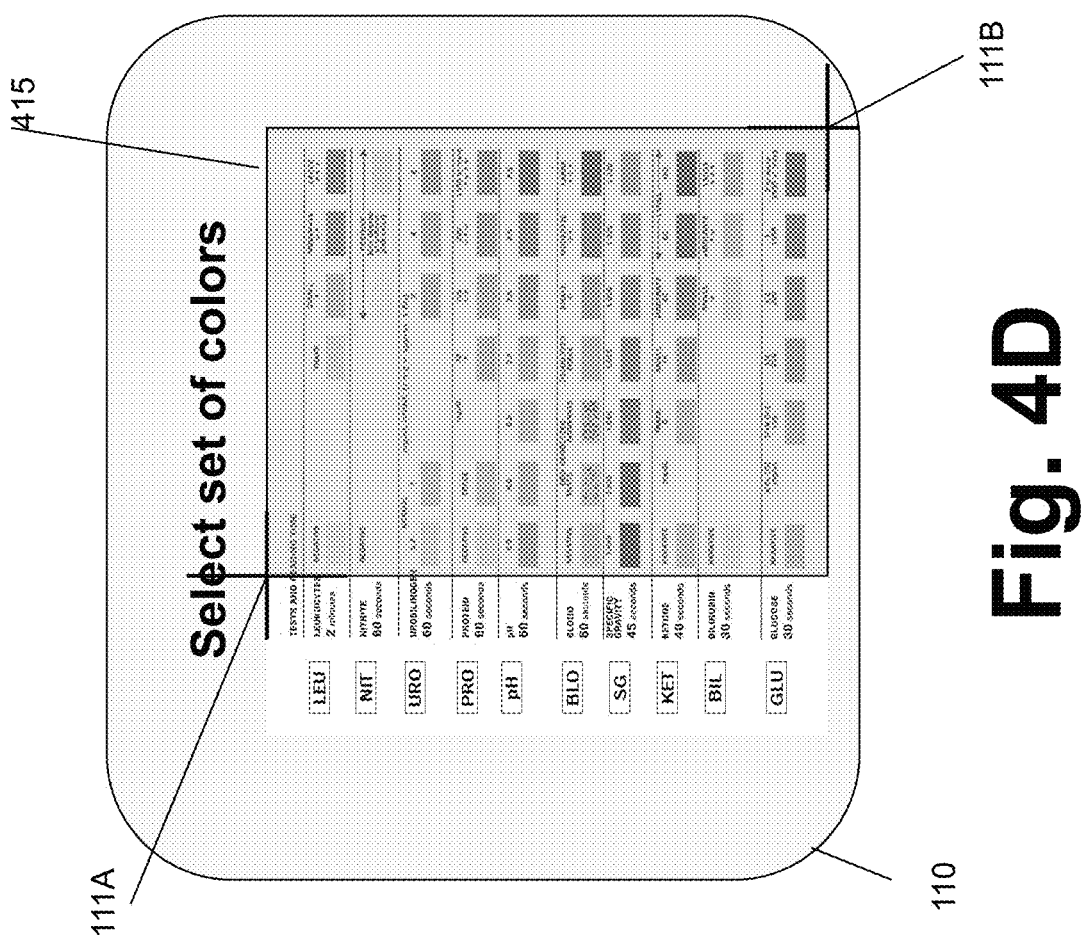
FIG. 4D illustrates the zone selection method being used to select a set of colors of a set of color samples from the color chart shown in FIG. 4C.

FIGS. 4C-4D illustrate an exemplary application of the zone selection method of a set of color samples. FIG. 4C illustrates an interpretation table 412 of urinalysis as provided by manufacturers. The interpretation table 412 includes a set 414 of a plurality of color samples. The complete set 414 of the plurality of color samples in the interpretation table 412 can be selected as the set of color samples by the augmented reality glasses or head mounted display device using the zone selection method.

The user moves the augmented reality glasses or head mounted display device to optically align the crosshair 111 of the display device 110 at a first corner 111A of a selection zone 415, such as the upper left hand corner of the plurality of color samples 414. The user then selects the first corner 111A of the selection zone by validating the position with a voice command/touchpad click on a touchpad. The user moves the augmented reality glasses or head mounted display device to optically align the crosshair 111 of the display device 110 at a second corner 111B of the selection zone 415, such as the bottom right corner of the plurality of color samples 414. The user then selects the second corner 111B of the selection zone 414 by validating its position with a voice command/touchpad click on a touchpad.

Referring now to FIGS. 4E-4G, a third method of set selection of color samples using the head-mounted-display device is now described. Color samples of color may be selected one at a time and stored in memory of the head-mounted display device, such as memory 618 of the head-mounted display device 600 shown in FIG. 6. Individual color samples of color may be stored through voice command/touchpad click on touchpad during a selection process, such as the color sample selection process described herein with reference to FIGS. 1A-1C.

The stored color samples of color can be recalled from the memory of the head-mounted display device for display by the display device 110. The user issues a voice command/touchpad click on a touchpad cause the user interface of the glasses to enter into a stored color selection mode to recall the stored color samples from memory for display.

Referring now to FIG. 4E, a stored set 440 of color samples of color are displayed by the display device 110 in response to the command to enter into the stored color selection mode. The stored set 440 are displayed in an array of spaced apart color samples.

The user moves the cross-hair 111 on top of the desired color samples of color that are desired to be in the selected set of colors. For example, the cross-hair 111 is moved to be on top of the color sample 444 at a position 111C. The cross-hair 111 may be moved by motion of the glasses or head mounted display device with known motion control techniques (e.g., using of accelerometers, gyroscopes, compass, eye motion detection) or by known remote mouse or joy stick control via a touchpad, or voice commands (e.g., move up, move left, stop).

With the cross-hair over the color sample, the color sample may be chosen for inclusion within the set of selected colors. The selection may be made by voice command with a microphone or a touchpad click on a touchpad as described herein. The process of moving the cross hair over on top of the desired samples and selecting them for inclusion into the set of color may be repeated over and over again until all desired colors of color samples are selected from those stored. A voice command or a button selection/click on touchpad can then be used to then close the set of selected color samples when the user is finished doing so.

Reference is now made to FIG. 4G. After the set of selected colors is closed by the user, the user interface displays the selected set 449 of colors color samples selected by the user. The user interface displays a status 448 for the window that indicates the selected set of colors is being displayed. Subsequently, a comparison of the set of selected color samples may be made.

Comparing Sets of Colors Under Same Lighting Conditions

Referring now to FIG. 5A, a color comparison may be made between a selected color sample 550 and a selected set 551 of colors. The color sample 550 may be selected by a similar selection process to that described with reference to FIGS. 1A-1C. The selected set 551 of color samples may be selected by one of the methods described herein with reference to FIGS. 4A-4G. After the selected set 551 of colors is selected, the user may issue a command to a processor, such as in the glasses or head-mounted display device, to enter a comparison mode.

In FIG. 5A, the display device 110 displays a comparison window including the color sample 550 near an edge of the window and the set 551 of colors located near a center of the window to provide a visual comparison of what is to be compared. The user interface generates a status indicator 553 of "Compare to Set of Colors" on the display device 110. A processor, such as processor 650 shown in FIG. 6, executes instructions to perform a color comparison between the color sample 550 and the set 551 of colors. Upon completion of the comparison, the processor can cause the display device 110 to display a results window indicating a closest match between the color of the color sample 550 and the color of one of the color samples in the set 551 of color samples.

Figure 5B:
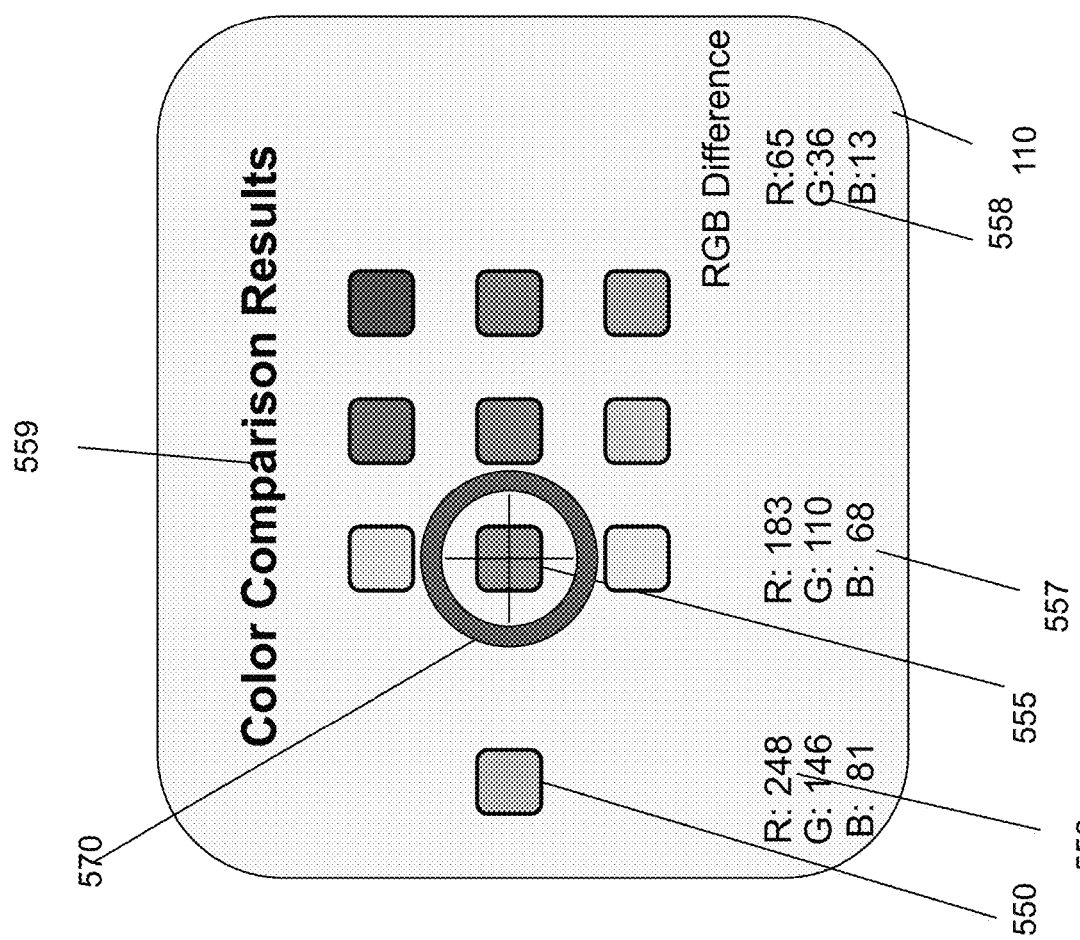
FIG. 5B illustrates a results window displayed by a display device in response to the comparison of a color sample to a set of colors in a set of color samples.

In FIG. 5B, a results window is illustrated including a user interface generated status indicator 559 of color comparison results. The results window displays the color sample 550 and its associated RGB values 556. The results window highlights the closest matching color in the set 551 to the color of the color sample. The results window displays a circle or bulls eye (cross-hair in a circle) 570 about the color sample 555 in the set 551 of color samples that most closely matches the color of the color sample 550.

The RGB values 557 associated with the most closely matched color sample 555 are also displayed in the results window in line with the RGB values 556 of the color sample 550 for a visual comparison. An RBG difference 558 between the RGB values 556 of the color sample 550 and the RGB values 557 associated with the most closely matched color sample 555 may also be calculated by the processor and displayed in the results window by the display device 110.

After the user has adequately viewed the results screen, he/she may issue another command to the glasses or heads mounted display device to return to a normal viewing mode, to shut down or turn off, or to perform another selection and color compare process.

There are a number of applications for the color set comparison process. One application for color set comparison is in the medical field and the interpretation of a urinalysis. Another application for the color set comparison is to match a paint color to a color in a set of colors displayed on pantone cards.

The color set comparison process may be performed under the same or similar lighting conditions. Alternatively, the color set comparison process may be performed under different lighting conditions. That is, the color sample 550 may be illuminated by a first lighting condition while the set 551 is illuminated by a second lighting condition that differs from the first. A color set comparison process performed with similar lighting conditions has less noise and therefor can be accurate without any calibration or special techniques. It may be desirable in a color set comparison process with different lighting conditions for the color sample and the set of colors to perform further techniques to improve the comparison results.

Calibrating Lighting and Illuminance

Lighting calibration is often useful for operations involving lighting corrections, color corrections, as well as mapping colors into a calibrated environment.

One simple way of doing is to look directly into the light source with a head-mounted-display. The camera in the head mounted display device can generate a spectrogram of the captured light from the light source and can compare it to the type of light associated with pre-existing lighting standards, such as the International Commission on Illumination (CIE) standard illuminants A, B, C, D50, D55, D65, D75, E, and F1-F6. CIE standard illuminant A is intended to represent typical, domestic, tungsten-filament lighting. Illuminants B and C are daylight simulators. Illuminant B serves as a representative of noon sunlight, with a correlated color temperature (CCT) of 4874 K, while illuminant C represents average day light with a CCT of 6774 K. The D series of illuminants are constructed to represent natural daylight. Illuminant E is an equal-energy radiator; it has a constant spectral power distribution inside the visible spectrum. The F series of illuminants represent various types of fluorescent lighting.

Illuminance can be directly estimated by a camera, such as camera 626 shown in FIG. 6. A rough value of illuminance is reported in the camera metadata (e.g., jpegMetadata.DigitalCamera.BrightnessValue). This rough value of illuminance can be used in the process of comparing colors to improve accuracy.

If lighting conditions of an object is near to one of these lighting standards, the captured images can be labeled with the type of lighting source associated with the lighting standard. A comparison of types of lighting sources can be made when it is associated with the captured images. A comparison of types of lighting sources may be made to determine if two color images were captured with the same or different lighting conditions. If the lighting sources and thereby lighting conditions differ, color corrections may be made to one or more images to compensate for the different lighting sources and conditions.

Automatic Color Corrections

Figure 7A:
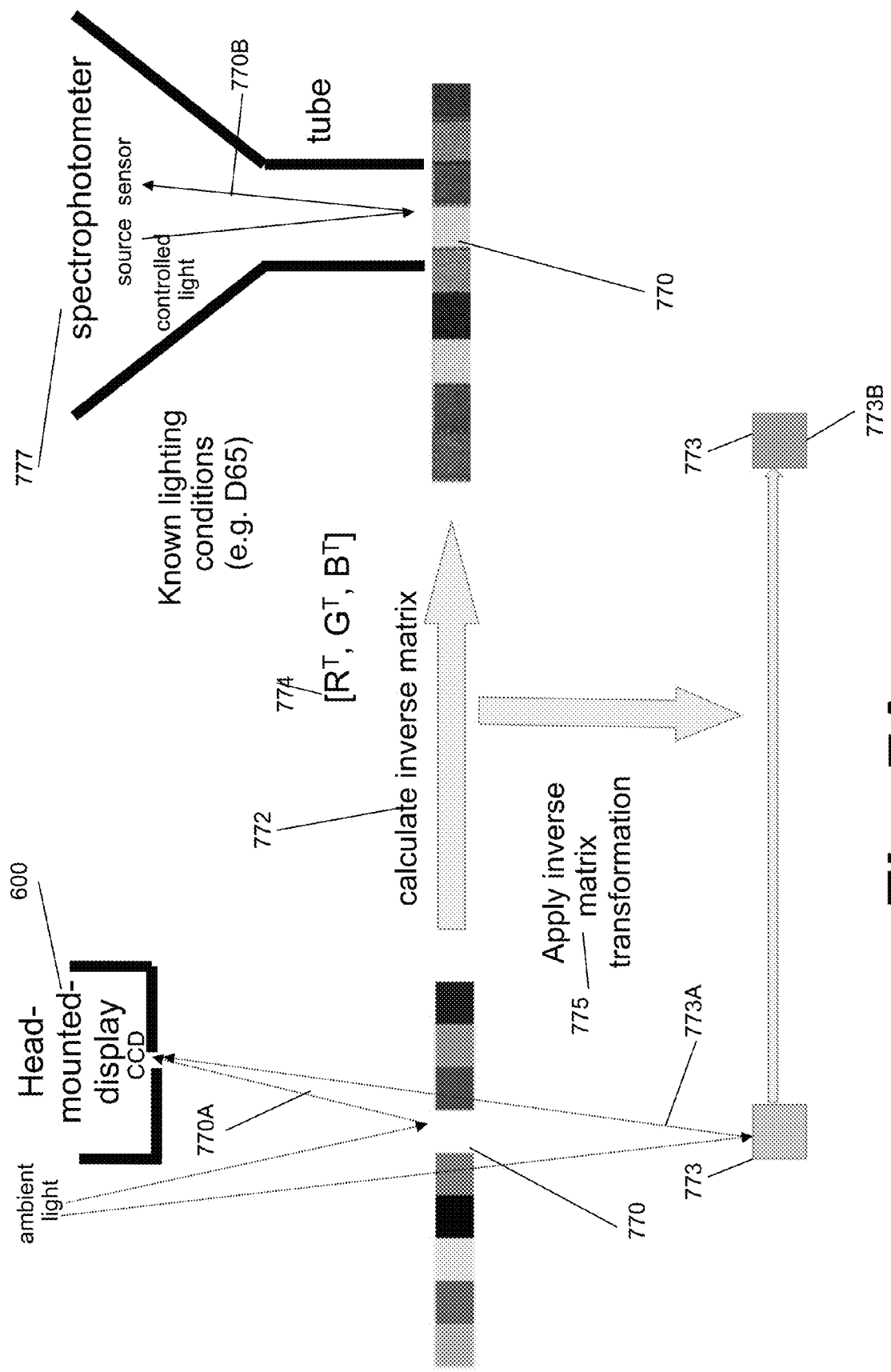
FIG. 7A-7B illustrates an automatic color correction method of a captured color of a color sample in response to a color reference bar and different lighting conditions.

Referring now to FIG. 7A, a method of automatic color correction is now described. The color of a color sample 773A is desired to be recognized. Included adjacent the sample 773 is a color reference bar 770. The color reference bar 770 may include color samples for one or more of the following colors:—Cyan, Magenta, Yellow, Key (black), Gray, White, Red, Green, Blue.

An unknown lighting source, such as ambient light, is projected onto the color reference bar 770 and the color sample 773 to respectively reflect colors 770A and color 773A back to a head mounted display device 600. A color camera (e.g., charge coupled device (CCD), CMOS-sensor) in the head mounted display device 600 is used to capture a color image of the color 773 of the color sample 773 and the colors 770A of the color reference bar 770 under an unknown light source (e.g., ambient light) with the same lighting conditions for each.

Previously, reflected colors 770B of the color reference bar 770 were determined under a known lighting source providing known lighting conditions (e.g., CIE illuminant D65). One way of measuring the colors 770B of the color reference bar 770 is by using a spectrophotometer 777 with a lighting source providing a known lighting condition (e.g., CIE illuminant D65). The color reference bar 770 is placed under the spectrophotometer 777 and a sensor captures the colors 770B reflected back from it that were generated by the incident light of a controlled lighting source generating a know type of light source and known type of lighting condition. The known type of lighting condition may be associated with the colors 770B captured from the reflections on the color reference bar 770.

The method of automatic color calibration calculates 772 an inverse transformation (in the form of an inverse transform matrix 774) linking the color 770A generated by the color reference bar 770 under an unknown light condition to the color 770B generated by the color reference bar 770 under a known light condition and light source. An inverse transform matrix 774 is calculated linking the color 770A reflected under an unknown lighting condition to the color 770B reflected under the standardized D65 light source and conditions that were used in the spectrophotometer 777.

The inverse transform matrix 774 may be used by a processor to automatically apply 775 a color calibration to the color 773A of the color sample 773 determined under unknown light conditions. When the matrix 774 is applied, the color 773A of the color sample 773 under unknown lighting conditions is corrected to the color 773B (an equivalent corrected color) of the color sample 773 under the known lighting conditions, such as illuminant D65 of the spectrophotometer 777.

By incorporating such a reference color bar 700 into the camera field of the color sample 773, automatic color corrections, as well as lighting corrections and color comparisons in an automatically calibrated environment, can be performed by methods and apparatus disclosed herein.

Further detailed principles of color correction are described in Burg '397 and incorporated herein by reference.

Comparing Two Colors in Automatically Calibrated Environment

Figure 7B:
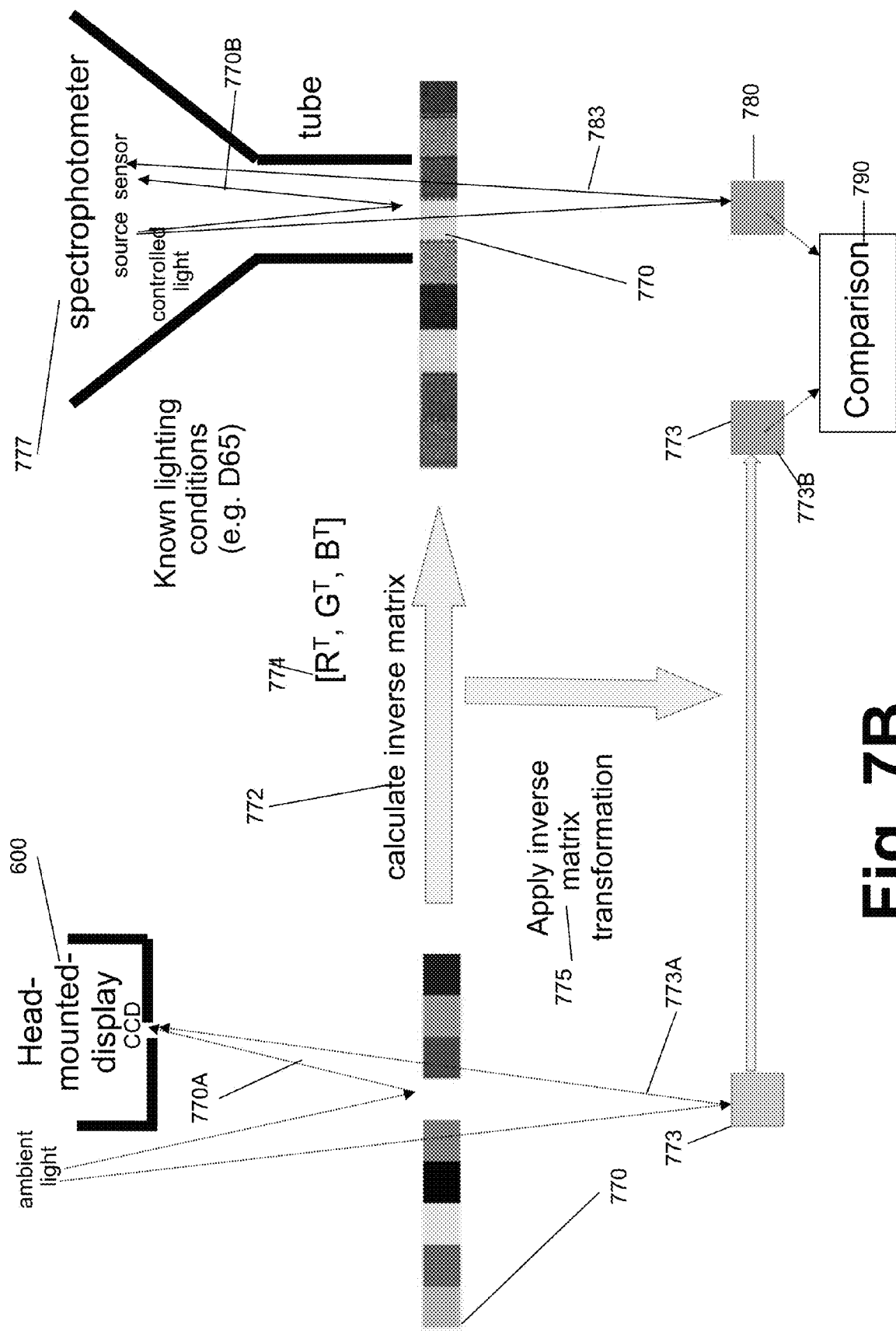

Referring now to FIG. 7B, when a color reference bar 770 is viewed by a head-mounted-display device 600, a processor can automatically make color corrections using an inverse transform matrix 774 to the color 773A of a color sample 773 captured under unknown lighting conditions. Oftentimes known colors 783 of known color samples 780 are captured in a calibrated environment under known lighting conditions by a spectrophotometer 777 just as the colors 770B of the color reference bar 770. A more accurate comparison 790 may then be made between the transformed color 773B of the color sample 773 and the known color 783 of the known sample 780.

There are a number of applications of automated color calibration with color comparisons. To compare or match colors of clothes, images of color samples of clothes or cloth stored in a cupboard or closet under known lighting conditions may be captured by the heads on display device in a calibration mode and then compared with automatically corrected colors of images of color samples captured at a clothing shop under unknown lighting conditions.

The selection of the right skin tone for make-up is complex since every make-up manufacturer has a different color system. To compare or match skin tone color of makeup, images of color samples of skin tone with make up captured under known lighting conditions (e.g., at home)

may be captured by the heads on display device in a calibration mode and then compared with automatically corrected colors of images of color samples of skin tone with makeup captured at a shop (e.g., a department store) under unknown lighting conditions. Using the head-mounted display device to compare skin tone of makeup under a known lighting (the reference or calibrated skin tone) with skin tone of makeup applied and sold in shops under whatever lighting conditions, overcomes the use of the different manufactures of makeup using different color systems.

Additionally, automated color correction can be used to more accurately identify and associate color samples taken under unknown lighting conditions with color names of colors captured under known lighting conditions.

Comparing Sets of Colors in an Automatically Calibrated Environment

While FIG. 7B only shows a single color sample 780 for comparison with the color sample 773, a set of color samples captured under known lighting conditions may be compared with the color sample 773. The set of color samples would also be captured with a color reference bar 770 under known lighting conditions such as under the spectrophotometer 777.

The head mounted display device 600 can then be used to capture the color of the color reference bar 770 and color sample 773 under unknown lighting conditions, calculate the inverse transform matrix, apply a color correction to the color 773A of the color sample 773 obtaining the corrected color 773B, and compare the corrected color 773B with the known set of colors of the color samples captured in a calibrated environment with known lighting conditions.

Detecting Color Gradients Over Time

A number of applications of color comparison can benefit from observing color changes over time. Color changes over time can be recorded using the camera and video capabilities of the head-mounted-display. The camera records a temporal sequence of images. The processor can extract a color of a color sample in each image and calculate a plurality of color gradients (e.g. a difference in RGB color values) from one image to the next over the sequence of images of a known time period. The color gradients can be used for comparison against known color gradients to improve the color comparison process.

Previously, the head mounted display device was issued a command to enter a color selection mode and capture a single still image of color of a color sample. In capturing video, the head mounted display device is instructed to enter a different mode, a video recording mode.

The user issues a voice command/touchpad click to the head mounted display device to enter into a video recording mode. A color sample of interest is then similarly selected as described and shown with reference to FIGS. 1A-1C. Alternatively, a set of color samples of interest may be similarly selected as described and shown with reference to FIGS. 4A-4G.

A video of the color sample of interest is captured including a plurality of images over a known period of time with time stamps. After the video is captured, the color of the color sample of interest may be analyzed and determined in each image of the video. The difference in color from one image to the next, a color gradient, may be calculated. Knowing the time stamp from one image to the next, gradients over time may be calculated between each image.

A set of colors of color samples may then be selected for comparison, such as described with reference to FIGS. 4A-4G. A color compare operation may then performed as was described with reference to FIGS. 5A-5B.

Known color gradients may be received with or calculated from the set of colors of color samples. The computed color gradients of the color sample changing over time may be compared with the known color gradients of the set of colors of color samples. This may provide a more reliable color comparison.

The computed color gradients from the video of the color sample may also provide information associated with a start time and an end time of color change of the color sample, such as a start and stop time of a chemical reaction. If there is no change in color gradient near the beginning of the video, the chemical reaction may not have started. If there is no change in color gradient near the end of the video, the chemical reaction may have stopped.

Methods and apparatus described herein may be used in applications related to the food industry. For example, a cake may be observed while it is baking to determine when it is fully baked to avoid under cooking and over cooking. Liquids with different colors can be observed when being mixed together (e.g., making a kir royal drink) so that the proper concentrations of each is made. Methods and apparatus described herein may be used in applications related to the medical industry. Bodily and biologic samples may be observed to extract colorimetric information. For example, wound treatments, skin color changes, and urinalysis color changes can be analyzed for color changes to determine medical condition changes. Methods and apparatus described herein may be used in applications related to the photography industry. For example, methods and apparatus described herein may be used to detect color changes in the sun light to capture the best light at sunset.

Comparing colors taken in uncontrolled lighting conditions can be used to perform color corrections, establish color calibrations, generate color trajectories, measure the illumination of scenes, (delivering lux meter measurements in uncontrolled lighting conditions), measure color gradients over time, correct for color reflection, and correct for textured supports.

Applications

The application of automatic color comparison with head-mounted displays or augmented reality glasses include those in photometry, colorimetry, and reagent interpretation. The generic photometry applications include detection of illumination (e.g., a lux meter), detection of color balance, and detection of color variations (such as at or around sunset). Specific colorimetry applications include color matching (e.g., application to guide paint choice, colors in frames, buying clothes, etc.); color interpretation for color blind people; color determination of textured objects; color classification of textured objects; color matching of textured objects; and color gradient over time.

Referring now to FIG. 8, a head-mounted display device or augmented reality glasses executing an automatic color comparison application can be used in the interpretation of reagent dipsticks. FIG. 8 illustrates a reagent dipstick 880 and a reference color chart 881. The reagent dipstick 880 may be an off-the-shelf reagent dipstick.

The reagent dipstick 880 includes one or more reagent test pads 850, each with a reagent to analyze an analyte in a biological sample. The one or more reagent test pads 850 undergo a chemical reaction when exposed to the analytes in a biological sample. In response to the chemical reaction, the color of the reagent test pads change over time in response to concentrations or levels of analyte in the biological sample. The final color of the reagent test pad shortly after the chemical reaction is completed is desirable to determine the concentration or level of analyte in the biological sample.

After being exposed to the biological sample, the dipstick 880 may be placed next to the color chart 881. A video of the chart 881 and the dipstick 881 may be captured by the camera in the head-mounted display device to capture the reagent test pads changing color over time. The color of the reagent test pads may be analyzed and its color levels calculated for each frame by the processor in the head-mounted display. The colors 885 in the reference chart may also be analyzed by the processor with color values assigned to each reference color sample in the set 885. A color comparison may be performed between the color values of the reagent test pads and the color values of set of reference colors 885 of the chart 881, on a frame by frame basis if desired. A final stable color of the reagent test pads in an image frame, representing an end of a chemical reaction, is desirable to compare with the reference colors of color samples in the color chart 881.

A gradient of the color change of the reagent test pads may be calculated between image frames by the processor. A known gradient may be computed from the chart 881 for each test pad 850. A set of colors 883 for a given reagent test pad 882 may be selected and a known gradient computed by the processor. The processor may further compare the known gradient from the set of reference colors 883 to the gradient computed for the reagent test pad 882.

Analytical and/or statistical methods may be used by the processor on the colors of the reagent test pads and reference colors 881 captured by the camera (and optionally with scene information provided by the camera) in order to determine the nearest final color of reagent to reference color in the set and the corresponding analyte levels in the biological fluid being tested.

Images of the reagent dipstick 880 and the reference color chart 881 are typically captured under the same lighting condition, such that auto color correction for different lighting conditions is unnecessary. However, if the images of the reagent dipstick 880 were captured under different lighting conditions from that of the colors in the reference color chart 881, it may be desirable to automatically correct for color differences to improve the accuracy of the color comparison process and ultimately the prediction of analyte concentration in a biological sample.

To gain further accuracy in the color comparison process, the reagent dipstick 880 and/or the color chart 881 may include a color reference bar 770 such as shown in FIG. 8. With the color reference bar 770, an automated color correction process can occur prior to the comparison of color and gradients.

Interpretation of Scanaflo Tests

Referring now to FIG. 9, a test paddle 900 is illustrated including a color reference bar 770, a matrix or two-dimensional bar code 910, and a set of reagent test pads 920.

Each reagent test pad includes a reagent that can chemically react with an analyte in a biological sample. In response to the chemical reaction, the color of the reagent test pads change over time in response to concentrations or levels of analyte in the biological sample. The final color of the reagent test pad shortly after the chemical reaction is completed is desirable to determine the concentration or level of analyte in the biological sample.

A single image of the final color of the reagent test pads in the set may be captured. However, for a more accurate analysis and result, a series of images over the chemical reaction time of the reagent test pads is desirable to capture in a video using the camera in the head-mounted display.

After being exposed to the biological sample, a video of the test paddle, including the color bar and the set of test pads 920 may be captured by the camera in the head-mounted display. The video captures a temporal sequence of images of the reagent test pads changing color over time. The color of the reagent test pads may be analyzed and its color levels calculated for each frame by the processor in the head-mounted display. A gradient of the color change of the reagent test pads may be calculated between image frames by the processor.

The captured colors of a reagent test pad 991 in the video images are to compared to a set of calibration curves. The sets of calibration curves represent the colors of a test pad corresponding to the whole spectrum of analyte concentrations, at then end of the reaction, through absolute calibration.

A final stable color of the reagent test pads in an image frame, representing an end of a chemical reaction, is desirable to compare with the set of calibration curves to determine the analyte concentration or level. However, the images of the set of reagent test pads 920 are captured under different lighting conditions from that of the colors in the set of calibration curves. Information regarding the calibration curves, lighting conditions, and colors of the color reference bar may be obtained over the internet by using the two dimensional bar code 910. With the lighting conditions of the calibration curves, standard colors of the color reference bar, and captured color of the color reference bar 770, an inverse transform matrix may then be computed by the processor to correct the captured colors of the reagent test pads. The captured colors of the reagent tests pads are color corrected by the processor using the computed inverse transform matrix. The result is the nearest color in the automatically calibrated environment, as described in Burg '397.

As mentioned previously, a gradient of the color change of the reagent test pads may be calculated between image frames by the processor. Burg '536 introduces an additional method for analyte interpretation based on the change of color gradients corresponding to the chemical kinetics of the reaction, typically described in the art by the Michaelis-Menton equation. This method can increase precision because it bases its results on a video-sequence of images versus a single image.

Augmented Reality Glasses

Referring now to FIG. 10, augmented reality glasses 1000 are shown. The augmented reality glasses 1000 include a memory 1008 and a processor 1006 coupled together. A camera 1004 coupled to the processor is used to capture images. A small display device 1002 coupled to the processor 1006 is located in one eyepiece. The other eyepiece has an eyeglass or lens 1010 that may be transparent to allow the user to see a real field of view. Preferably, the camera 1004 is mounted to or integral with the glasses 1000, however some Heads-Up-Display (HUD) devices or head mounted display devices may not include an integrated camera. In such cases, another image capture device connected to the processor may be used to capture images in front of the user in his/her field of view. In an alternate embodiment, the display device 1002 is substituted by a lens 1010' that can receive a projected image from a projecting device 1050 mounted to a temple 1030 of the eyeglass frame and coupled to the processor 1006.

Enhancing Street Signs

In FIG. 10, the augmented reality glasses 1000 can be used to augment reality while operating or riding in a vehicle. In this application, street signs are extracted from images, enhanced, and displayed in the display device 1002 in the vision of users wearing the augmented reality glasses 1000. Street signs have high visibility colors with recognizable shapes that can be detected in images and extracted so that the information is enhanced to the user.

The eyeglass 1010 of the glasses 1000 shown in FIG. 10 illustrate a real street view 1020 as perceived by the eye of the user. The real street view 1020 includes a road with street signs 1021 near the edge of the road.

The display device 1002 in the other side of the eyeglass shows the image of the street captured by the camera 1004 but augmented with digitally created street signs 1022 to form an augmented street view 1025. In one embodiment, the color-coded street signs in the image are recognized by the processor, extracted from the image, magnified in size, and temporarily overlaid onto the image of the street, as the digitally created street signs 1022, for display in the display device 1002. After the vehicle passes the signs 1021, the digitally created street signs 1022 are removed from the street images displayed in the display device 1002.

Enhancing Color Documents

Referring now to FIG. 11, the augmented reality glasses 1000 with application software can be used to enhance the reading of color maps. A color in a color map may be enhanced to display more relevant information with emphasis. For example, a route with a yellow color may be detected in the color map 1102 representing the route taken through stations of a transportation system. The yellow colored route may be enhanced in a manner to emphasize the route, overlaid onto an image of the map, and displayed in the display device 1002.

The eyeglass 1010 in FIG. 11 illustrates the original map 1102 as perceived by one eye of the user through the eyeglass. The camera 1004 captures an image of the map 1102 and displays an enhanced color map image 1104 in the display device 1002 of the opposite eyeglass of the glasses 1000. The enhanced color map image 1104 includes an enhanced yellow color route 1114 to enhance a route that may be of more interest to a user.

The application enhances the color map 1102 by emphasizing a particular color in the enhanced color map image 1104. Enhancing a color map can assist people having difficulties reading a map. Moreover, generally enhancing color information in any document such as with an emphasized or enhanced color can assist people that have impaired color vision.

Control Processes

Color changes sometimes occur over a process or method of preparation of a good, such as food or baked goods. Measuring the color change can help control—baking, roasting, torrefying—the speed at which food is prepared or cooked. For example, when using a broiler or a high temperature oven, the colors of goods in the oven first evolve slowly before accelerating exponentially. Bakers may use their skill, precise thermometers, and/or timers/stop watches to gage the doneness of a baked good, for example.

Referring now to FIG. 12, the augmented reality glasses 1000 may be used with software to assist the gage of doneness of baked goods or other foods that are cooked. The augmented reality glasses 1000 with application software may track the speed of color evolution of baked goods or other food. The camera 1004 of the augmented reality glasses 1000 captures video of the baked goods as its changes color. The processor can measure the color gradient of the changing color to allow for dynamic adjustments in the baking or cooking process to get the desired result of doneness. For example, when baking croissants the oven temperature may be raised to achieve a desired color gradient over time.

FIG. 12 illustrates a baked good (or cooked food) 1202 with a current color at a give time through the eyeglass 1010. The camera captures an image of the baked good with its current color at the given time and displays it in the display device 1002. The processor analyzes the current color of the baked good captured in the image. Overlaid onto the captured images of the baked good is a color gradient chart 1210 that includes a color gradient curve 1214. The color gradient curve 1214 represents the goal of the baking/cooking process for the selected baked good/cooked food. The color gradient curve 1214 represents how the baked good/cooked food should be baked or cooked over time.

The processor plots the current color of the baked good/cooked food as an arrow 1212 at the current time on the time line of the color gradient chart 1210. The end point of the arrow head of the arrow 1212 may represent the measure of color in the current baked good. If the end point of the arrow 1212 is below the color gradient curve 1214, the temperature may be increased or the baking time may be increased to obtain the desired color goal and doneness in the baked good/cooked food. Assuming the temperature is to remain the same, the processor may calculate and display the remaining baking time or cooking time. If the end point of the arrow 1212 is above the color gradient curve 1214, the temperature may be decreased or the baking time may be decreased to obtain the desired color goal and doneness in the baked good/cooked food.

In this manner, the glasses 1000 augment reality of the baking/cooking process by adding a color gradient chart 1210 and arrow 1212 in the augmented baked good image 1204.

CONCLUSION

When implemented in software, the elements of the embodiments are essentially the code segments or instructions executable by a processor (e.g., processor 1006 shown in FIGS. 10-12) to perform the necessary tasks. The program or code segments can be stored in a storage device or a processor readable medium (e.g., memory 1008 shown in FIGS. 10-12). Examples of a processor readable medium include an electronic circuit, a semiconductor memory device, a read only memory (ROM), a flash memory, an erasable programmable read only memory (EPROM), a floppy diskette, a CD-ROM, an optical disk, a hard disk, a fiber optic medium, a radio frequency (RF) link, etc. The code segments or instructions may be downloaded via computer networks such as the Internet, Intranet, etc.

While this specification includes many specifics, these should not be construed as limitations on the scope of the disclosure or of what may be claimed, but rather as descriptions of features specific to particular implementations of the disclosure. Certain features that are described in this specification in the context of separate implementations may also be implemented in combination in a single implementation. Conversely, various features that are described in the context of a single implementation may also be implemented in multiple implementations, separately or in sub-combination. Moreover, although features may be described above as acting in certain combinations and even initially claimed as such, one or more features from a claimed combination may in some cases be excised from the combination, and the claimed combination may be directed to a sub-combination or variations of a sub-combination. Accordingly, the claimed embodiments should be limited only by patented claims that follow below.

What is claimed is:

1. A method comprising:
capturing a plurality of digital color images of a reagent dipstick over a time period using a camera, the reagent dipstick including a color calibration bar and a plurality of reagent test pads exposed to a biological sample, wherein a color of a first reagent test pad of the plurality of reagent test pads changes over the time period in response to a concentration of a first analyte in the biological sample;
capturing a digital color image of a color chart using the camera, the color chart including a plurality of colors associated with concentration levels of analytes in the biological sample;
color correcting, using a processor, the captured plurality of digital color images of the reagent test pads to a lighting condition of the digital color image of the color chart based at least on the color calibration bar;
determining, using the processor, a gradient of color change over time of the first reagent test pad from the received plurality of color images of the reagent dipstick;
computing, using the processor, an expected gradient of color change over time for at least one test pad of the plurality of test pads from the captured digital image of the color chart; and
determining, using the processor, the concentration of the first analyte in the biological sample by comparing the determined gradient of color change of the first reagent test pad with the computed expected gradient of color change for the at least one test pad.

2. The method of claim 1, wherein the image of the color chart and the plurality of images of the reagent dipstick are concurrently captured under same lighting conditions.

3. The method of claim 1, wherein:
the image of the color chart is captured under a first lighting condition;
the plurality of images of the reagent dipstick are captured under a second lighting condition different from the first lighting condition; and
the method further comprises:
color correcting the colors of the reagent dipstick from the second lighting condition to the first lighting condition using an image of the color calibration bar in the plurality of images of the reagent dipstick prior to determining the concentration of the first analyte.

4. The method of claim 1, wherein
prior to determining the concentration of the first analyte, determining color values for each test pad of the plurality of reagent test pads; and
determining color values for the plurality of colors in the color chart.

5. The method of claim 1, wherein the camera is a camera of a head mounted display device.

6. The method of claim 1, wherein the color chart includes a second color calibration bar, and the captured digital image of the color chart includes a digital image of the second color calibration bar.

7. The method of claim 1, wherein the processor is part of a head mounted display device.

8. A method comprising:
capturing a plurality of images of a test paddle over a time period using a camera, the test paddle including a color calibration bar and a plurality of reagent test pads exposed to a biological sample;
color correcting, using a processor, the plurality of images of the plurality of reagent test pads to a lighting condition of a color image of a color chart based at least on the color calibration bar;
determining, using the processor, color values for each of the plurality of color corrected reagent test pads in each image of the plurality of images;
determining, using the processor, a gradient of color change over time of each test pad of the plurality of reagent test pads based on the determined color values;
receiving, via the processor, color calibration data associated with the test paddle based at least on the color chart, wherein the color calibration data associates an expected gradient of color change over time of each test pad with concentration levels of an analyte in the biological sample; and
determining, using the processor, concentration levels of analytes in the biological sample based at least on the determined gradient of color change for each test pad and the received color calibration data.

9. The method of claim 8, wherein determining the concentration levels of analytes is based on a color match for each test pad of the plurality of reagent test pads.

10. The method of claim 8, wherein the camera is a camera of a head mounted display device.

11. The method of claim 10, wherein the processor is a processor of the head mounted display device.

* * * * *